US008370868B2

(12) United States Patent
Smirnov et al.

(10) Patent No.: US 8,370,868 B2
(45) Date of Patent: Feb. 5, 2013

(54) SPINDLE MOTOR AND DISK DRIVER HAVING THE SAME

(75) Inventors: Viatcheslav Smirnov, Gyunggi-do (KR); Ho Jun Yoo, Gyunggi-do (KR); Yeol Choi, Gyunggi-do (KR); Nam Seok Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 110 days.

(21) Appl. No.: 13/064,438

(22) Filed: Mar. 24, 2011

(65) Prior Publication Data

US 2012/0047523 A1    Feb. 23, 2012

(30) Foreign Application Priority Data

Aug. 18, 2010  (KR) .................. 10-2010-0079984
Aug. 18, 2010  (KR) .................. 10-2010-0079987

(51) Int. Cl.
   *G11B 17/02* (2006.01)
(52) U.S. Cl. ...................................... 720/696
(58) Field of Classification Search .............. 720/696; 360/99.08; 310/90
   See application file for complete search history.

(56) References Cited

U.S. PATENT DOCUMENTS

| 5,193,084 | A  | * | 3/1993  | Christiaens ............... 720/696 |
| 6,339,273 | B1 |   | 1/2002  | Higuchi |
| 6,534,889 | B2 |   | 3/2003  | Katagiri et al. |
| 6,700,256 | B2 |   | 3/2004  | Fukutani et al. |
| 7,212,376 | B2 | * | 5/2007  | Burns et al. ............ 360/99.08 |
| 7,372,663 | B2 | * | 5/2008  | Leblanc et al. .......... 360/99.08 |
| 7,550,887 | B2 | * | 6/2009  | Sekii ........................... 310/90 |
| 7,650,697 | B2 | * | 1/2010  | Gomyo et al. ............ 29/898.02 |
| 8,013,487 | B2 | * | 9/2011  | Hirata et al. ................. 310/90 |
| 2002/0175577 | A1 |   | 11/2002 | Yoshitsugu et al. |
| 2008/0030109 | A1 |   | 2/2008  | Takaki et al. |
| 2010/0123975 | A1 |   | 5/2010  | Smirnov et al. |
| 2010/0187932 | A1 |   | 7/2010  | Kawai et al. |
| 2010/0293563 | A1 | * | 11/2010 | Park et al. ................. 720/696 |
| 2012/0047523 | A1 | * | 2/2012  | Smirnov et al. ........... 720/696 |

FOREIGN PATENT DOCUMENTS

| JP | 8-331796       | 12/1996 |
| JP | 2000-134894    | 5/2000  |
| JP | 2002-354742    | 12/2002 |
| JP | 2003-289636    | 10/2003 |
| JP | 2008-43045     | 2/2008  |
| JP | 2009-80883     | 4/2009  |
| JP | 2009-99173     | 5/2009  |
| KR | 10-2010-0054635 | 5/2010 |

OTHER PUBLICATIONS

Japanese Office Action issued Jul. 24, 2012 in corresponding Japanese Patent Application No. 2011-079478.

* cited by examiner

*Primary Examiner* — Mark Blouin

(57) ABSTRACT

Disclosed herein is provided a spindle motor and a disk driver having the same. There is provided a spindle motor including: a sleeve rotatably supporting a shaft; a bush combined with the top portion of the shaft to be rotated together with the shaft; a rotor case including a cylindrical wall part combined with the outer peripheral surface of the bush; an air flow spreading part formed on the axial bottom part of the bush and spreading the air flow generated between the shaft and the sleeve to the radial outer side when the shaft is rotated; and a sealing part formed on the axial bottom portion of the bush and formed between the cylindrical wall part and the air flow spreading part to seal oil when the shaft is rotated.

38 Claims, 27 Drawing Sheets

SPINDLE MOTOR AND DISK DRIVER HAVING THE SAME

CROSS-REFERENCE TO RELATED APPLICATIONS

This application claims the priority of Korean Patent Application No. 10-2010-0079984 filed on Aug. 18, 2010, and Korean Patent Application No. 10-2010-0079987 filed on Aug. 18, 2010 in the Korean Intellectual Property Office, the disclosures of which are incorporated herein by reference.

BACKGROUND OF THE INVENTION

1. Field of the Invention

The present invention relates to a spindle motor and a disk driver having the same, and more particularly, to a spindle motor capable of preventing air flow turbulence, caused when a shaft is rotated, and oil leakage and securing the assembly and rotation stability of a spindle motor from external impact applied to the spindle motor or force applied when a disk is loaded and removed.

2. Description of the Related Art

An apparatus for driving an optical disk-type recording medium is configured to read and write signals by moving an optical pickup device while loading a recording medium and rotating it.

The optical disk driver is classified into a slim drive set (12.7 mm), an ultra slim drive set (9.5 mm), and a super ultra slim drive set (7.0 mm) according to the thickness thereof and is classified as a tray type or a slot-in type, according to a recording medium loading method.

As described above, the optical disk driver is slimmed and the size of the spindle motor loading and rotating the recording medium accordingly needs to be small. To this end, there is a need to reduce the axial length of components of the spindle motor.

However, since rotating members should be manufactured to be thin, the adhesion between components of the rotating members is degraded, which makes it difficult to assemble the rotating members, causes undesirable rotation characteristics such as vertical vibrations, bending vibrations, and the like, and degrades the assembly and rotation characteristics of the spindle motor due to an external impact applied to the spindle motor or a force applied when the disk is loaded onto and removed therefrom.

In addition, since an axial gap between the rotating members and the fixing members of the spindle motor is small, the air flow turbulence occurs between the rotating members and the fixing members when the rotating members are rotated, and the noise and vibration levels are increased accordingly.

The air flow turbulence causes the unstable behaviour of the spindle motor and the leakage of oil from the bearing member when the spindle motor is in rotation. In addition, the unstable operation of the spindle motor generates a large amount of heat from the fixing members and degrades the efficiency of the spindle motor to increase the power consumption thereof.

SUMMARY OF THE INVENTION

An aspect of the present invention provides a spindle motor with improved rigidity to secure the assembly and rotational stability thereof while making the size of the spindle motor, in particular, the thickness thereof, to be thinned, and an optical disk driver having the same.

An another aspect of the present invention is to sufficiently secure a axial gap between rotating members and fixing members while making an apparatus thin to stably derive the air flow when the rotating members are rotated, and to suppress the occurrence of noise and vibration when the spindle motor is rotated.

In addition, another aspect of the present invention is to stabilize a driving of an apparatus to reduce power consumption while preventing oil leakage.

According to an aspect of the present invention, there is provided a spindle motor, including: a sleeve rotatably supporting a shaft; a bush combined with the top portion of the shaft to be rotated together with the shaft; a rotor case including a cylindrical wall part combined with the outer peripheral surface of the bush; an air flow spreading part formed on the axial bottom part of the bush and spreading the air flow generated between the shaft and the sleeve to the radial outer side when the shaft is rotated; and a sealing part formed on the axial bottom portion of the bush and formed between the cylindrical wall part and the air flow spreading part to seal oil when the shaft is rotated.

The air flow spreading part may be formed so that an axial gap between it and the top surface of the sleeve is increased toward the radial outer side.

The air flow spreading part may be formed to be inclined upwardly toward the radial outer side of the bush.

The bottom portion of the bush may be provided with an annular groove part by the air flow spreading part and the sealing part.

At least one of both side walls of the annular groove part may be formed to be inclined.

The outer diameter of the air flow spreading part may be formed to be substantially equal to the outer diameter of the sleeve.

The sealing part may be formed to be inclined downwardly from the radial outer side of the air flow spreading part to the inner peripheral surface of the cylindrical wall part.

The spindle motor may further include a taper part formed on the axial bottom portion of the bush and formed between the outer peripheral surface of the shaft and the air flow spreading part.

The taper part may be formed to be inclined downwardly toward the outer peripheral surface of the shaft from the radial inner side of the air flow spreading part.

According to another aspect of the present invention, there is provided a spindle motor, including: a sleeve rotatably supporting a shaft; a bush combined with the top portion of the shaft to be rotated together with the shaft; and a groove part formed on the axial bottom part of the bush and including a first inclined surface formed to be inclined upwardly toward the radial outer side of the bush and a second inclined surface formed to be inclined downwardly toward the radial outer side from the first inclined surface.

The first inclined surface may be formed to have inclination smaller than the second inclined surface.

According to another aspect of the present invention, there is provided a spindle motor, including: a bush combined with the top portion of the shaft to be rotated together with the shaft; a rotor case including a cylindrical wall part combined with the outer peripheral surface of the bush; and a filling groove formed in at least one of a boundary portion between the shaft and the bush and a boundary portion between the bush and the cylindrical wall part and filled with a bonding material.

The filling groove may include a first annular groove part formed on the outer-diameter side of the shaft in a circumferential direction.

The first annular groove part may be formed to be expanded toward the axial top portion.

The first annular groove part may be formed to be narrow toward the axial top portion.

One side of the first annular groove part may be formed to be opened to the inner peripheral surface of the bush.

The filling groove may include a second annular groove part formed on the inner-diameter side of the bush in a circumferential direction.

One side of the second annular groove part may be opened to the outer peripheral surface of the shaft.

The other side of the second annular groove part may be formed to be inclined by a predetermined angle from the axial direction.

The bottom portion of the second annular groove part may be formed to be inclined by a predetermined angle in the radial direction.

The bottom portion of the second annular groove part may be formed to be stepped.

The spindle motor may further include a third annular groove part formed on the inner peripheral surface of the bush to be extended in the axial direction.

The third annular groove part may be formed to communicate with the second annular groove part.

The third annular groove part may be formed to allow the side wall to be inclined by a predetermined angle in the axial direction.

The spindle motor may further include a fourth annular groove part formed on the outer-diameter side of the bush in a circumferential direction.

The fourth annular groove part may be formed to be extended in the axial direction from the top outer peripheral portion of the bush.

The fourth annular groove part may be formed to allow the side wall to be inclined by a predetermined angle in the axial direction.

According to another aspect of the present invention, there is provided a disk driver, including: a bush combined with the top portion of the shaft to be rotated together with the shaft; a rotor including a rotor case including a cylindrical wall part fixedly combined with the outer peripheral surface of the bush and a magnet mounted on the inner side of the rotor case; a chucking part mounted in the rotor case and removably combining a disk; a sleeve rotatably supporting the shaft; a stator including a holder supporting the sleeve and a magnetic material interacting with the magnet; an air flow spreading part formed on the axial bottom portion of the bush and spreading air flow generated between the shaft and the sleeve when the shaft is rotated to the radial outer side; and a sealing part formed on the axial bottom portion of the bush and formed between the cylindrical wall part and the air flow spreading part to seal oil when the shaft is rotated.

The air flow spreading part may be formed to be inclined upwardly to allow an axial gap between it and the top surface of the sleeve to be increased toward the radial outer side.

The bottom portion of the bush may be provided with an annular groove part by the air flow spreading part and the sealing part and at least one of both side walls of the annular groove part is formed to be inclined.

The outer diameter of the air flow spreading part may be formed to be substantially equal to the outer diameter of the sleeve.

The sealing part may be formed to be inclined downwardly toward the inner peripheral surface of the cylindrical wall part from the radial outer side of the air flow spreading part.

According to another aspect of the present invention, there is provided a disk driver, including: a bush combined with the top portion of the shaft to be rotated together with the shaft; a rotor including a rotor case including a cylindrical wall part fixedly combined with the outer peripheral surface of the bush and a magnet mounted on the inner side of the rotor case; a chucking part mounted in the rotor case and removably combining a disk; a sleeve rotatably supporting the shaft; a stator including a holder supporting the sleeve and a magnetic material interacting with the magnet; and a filling groove filled in at least one of a boundary portion between the shaft and the bush and a boundary portion between the bush and the cylindrical wall part.

The filling groove may include: a first annular groove part formed on the outer-diameter side of the shaft in a circumferential direction; a second annular groove part formed on the inner-diameter side of the bush in a circumferential direction; and a third annular groove part formed to be longer on the inner peripheral surface of the bush in an axial direction.

The disk driver may further include a fourth annular groove part formed on the outer diameter of the bush in a circumferential direction.

The disk driver may further include: an air flow spreading part formed on the axial bottom part of the bush and spreading the air flow generated between the shaft and the sleeve when the shaft is rotated to the radial outer side; and a sealing part formed on the axial bottom part of the bush and formed between the cylindrical wall part and the air flow spreading part to seal oil when the shaft is rotated.

The air flow spreading part may be formed to be inclined upwardly to allow an axial gap between it and the top surface of the sleeve to be increased to the radial outer side.

The sealing part may be formed to be inclined downwardly toward the radial outer side of the air flow spreading part to the inner peripheral surface of the cylindrical wall part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
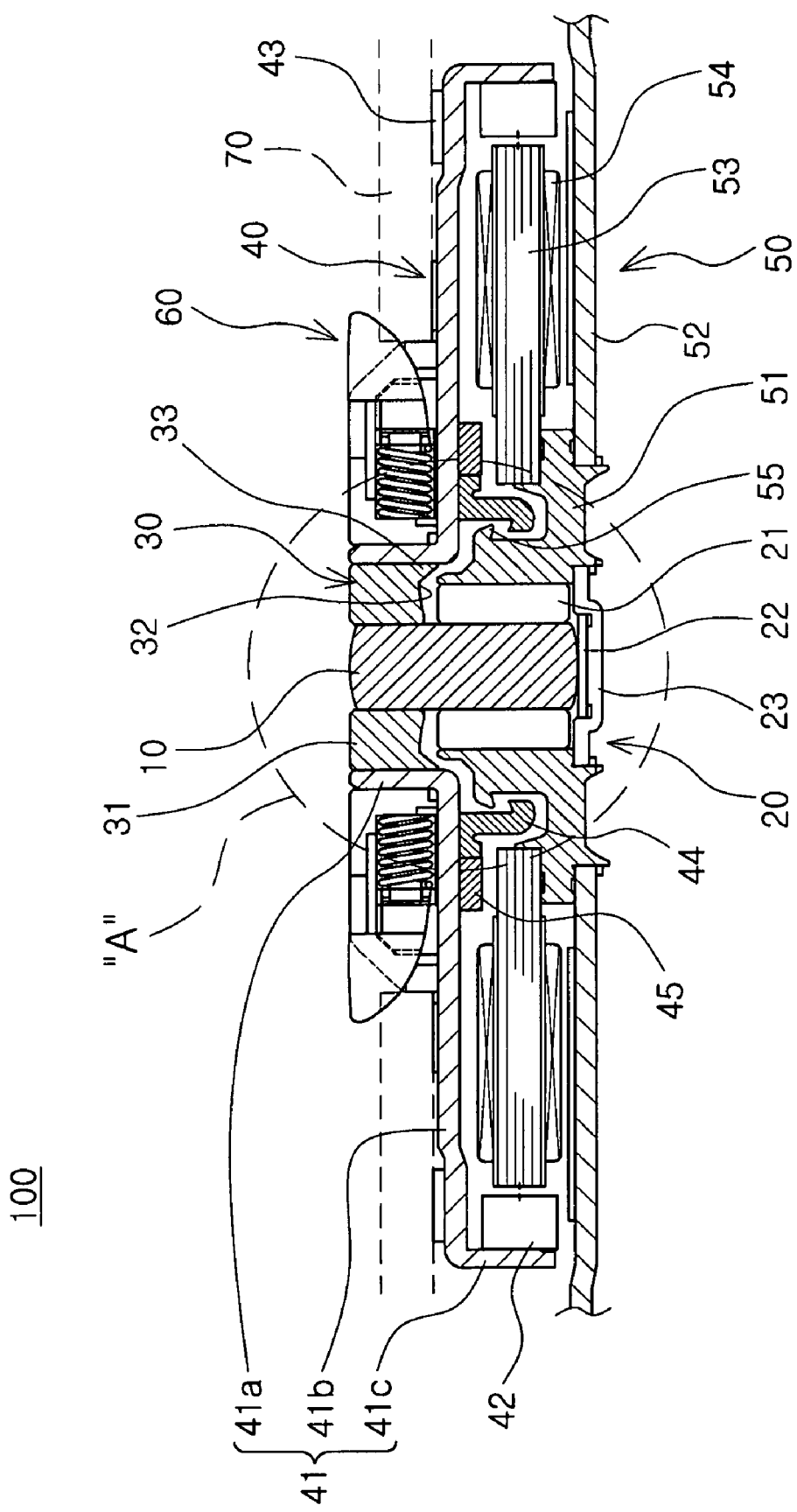
FIG. 1 is an axial cross-sectional view of a disk driver according to a first exemplary embodiment of the present invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 2:
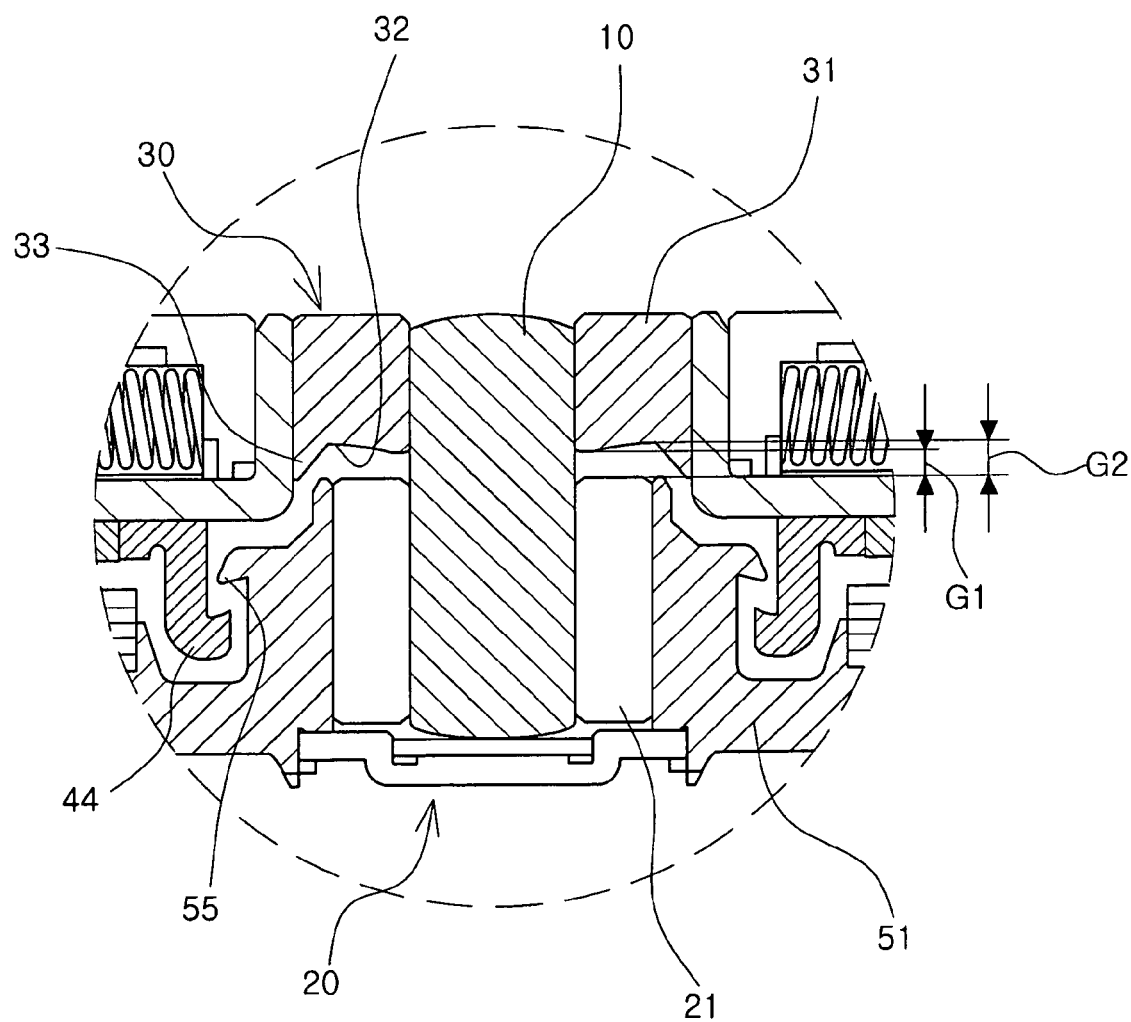
FIG. 2 is an enlarged view showing part A of FIG. 1.
Figure 3:
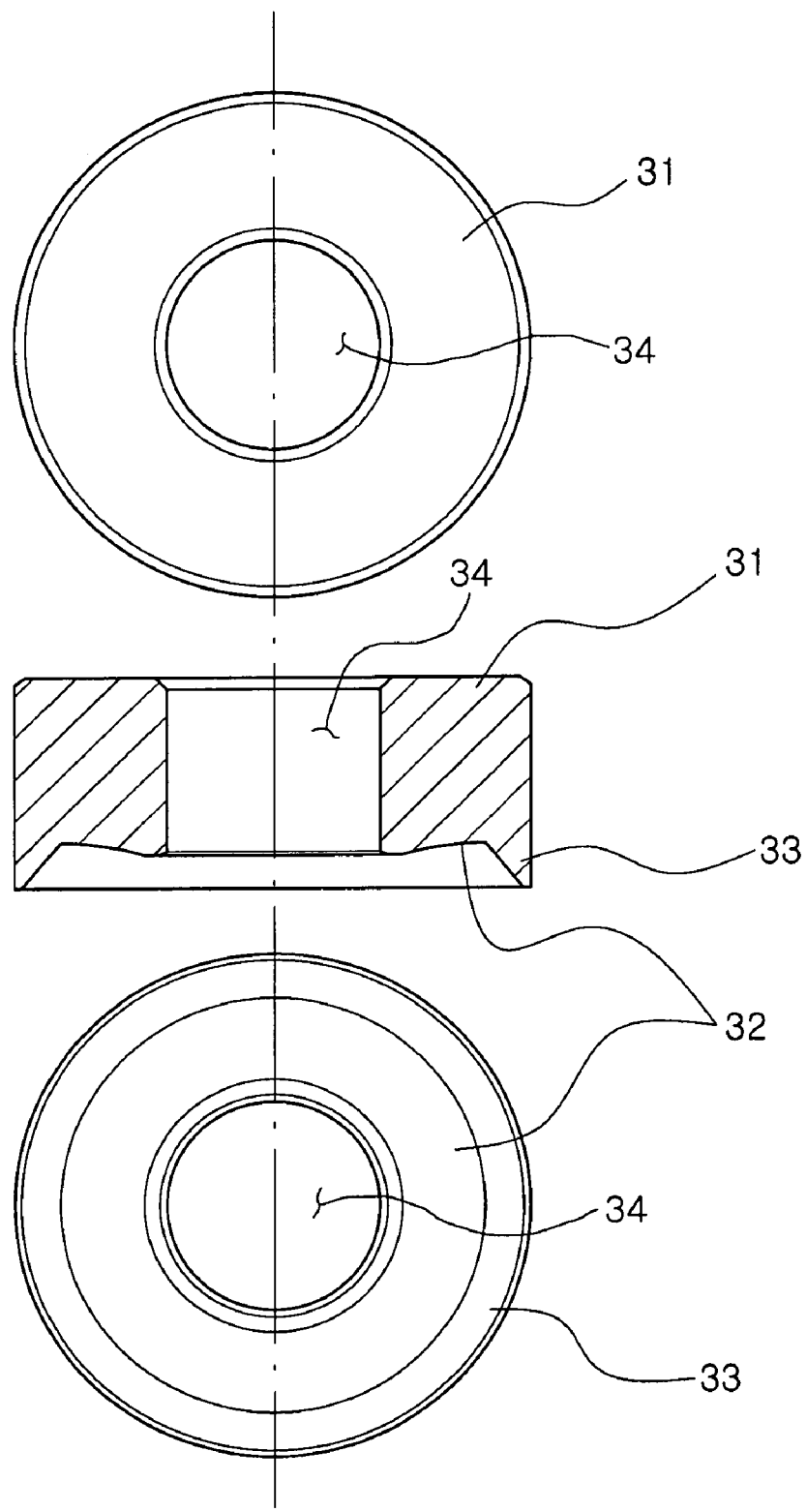
FIG. 3 illustrates a plan view, an axial cross-sectional view, and a bottom view showing a bush in the spindle motor according to the first exemplary embodiment of the present invention.
Figure 4:
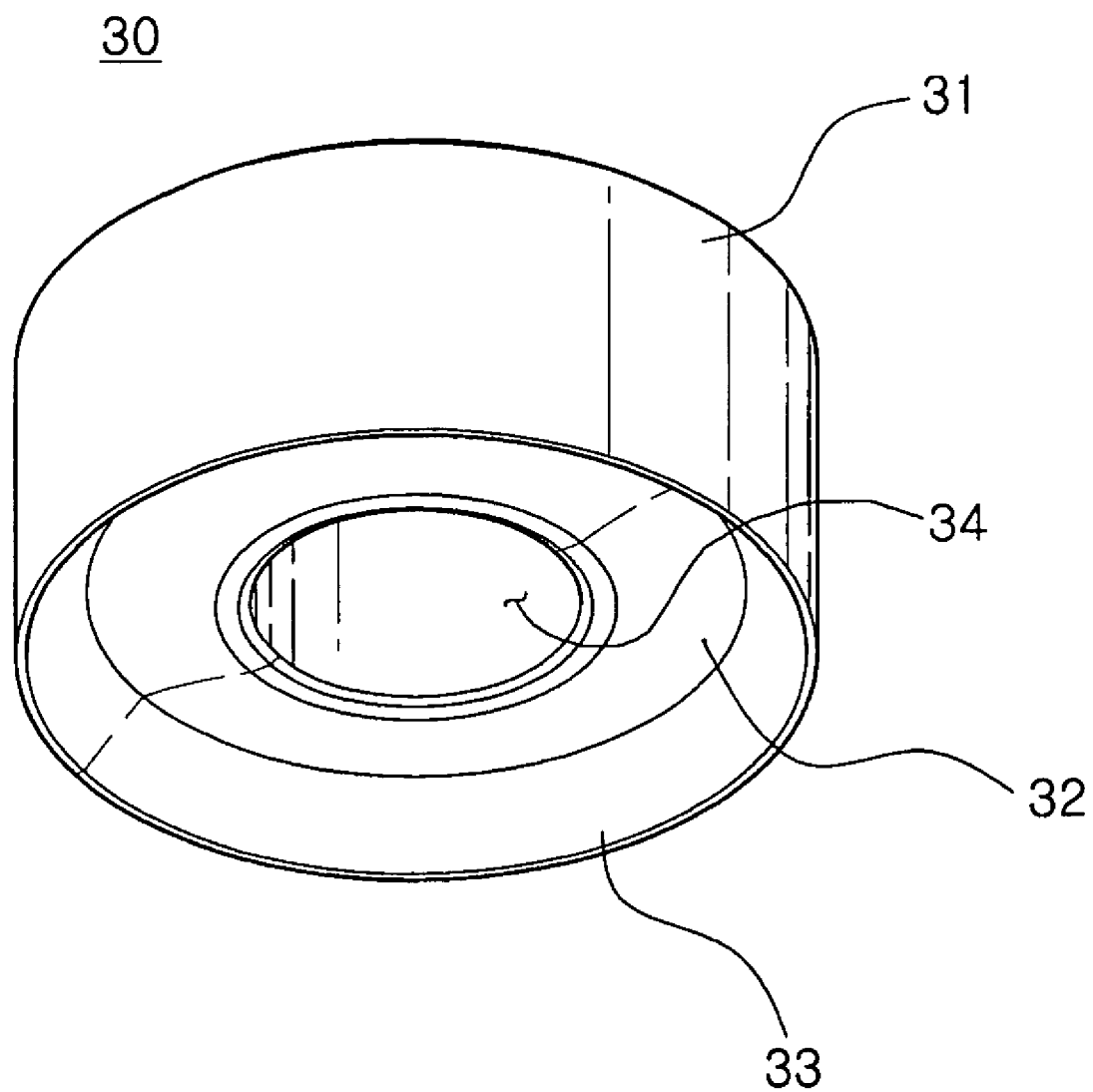
FIG. 4 is an upper perspective view of a bush in the spindle motor according to the first exemplary embodiment of the present invention.

FIG. 1 is an axial cross-sectional view of a disk driver according to a first exemplary embodiment of the present invention, FIG. 2 is an enlarged view showing part A of FIG. 1, FIG. 3 is a plan view, an axial cross-sectional view, and a bottom view showing a bush, and FIG. 4 is an upper perspective view of a bush.

Referring to FIGS. 1 and 2, a disk driver 100 according to a first exemplary embodiment of the present invention may be configured to include a spindle motor assembly acting as a rotation shaft, a rotor assembly 40, a stator assembly 50, and a chucking part 60.

The spindle motor assembly may be configured to include a shaft 10, a bush 30 combined with an outer peripheral surface of the shaft 10 and rotating together with the shaft 10, and a bearing part 20 rotatably supporting the shaft 10.

The shaft 10 is disposed on the same axis as a predetermined central axis and may be rotated based on a virtual rotation shaft when the spindle motor is rotated.

The bearing part 20 may be configured to include a cylindrical sleeve 21 rotatably supporting the shaft 10 in a radial direction, a thrust washer 22 disposed at the bottom side of the sleeve 21 and rotatably supporting the shaft 10 in a shaft direction, and a cover plate 23 covering the bottom portion of the sleeve 21 and the thrust washer 22.

In this configuration, when defining a direction, an axial direction indicates a direction parallel with the central axis of the shaft 10 and is divided into a top portion and a bottom portion, a radial direction indicates a direction perpendicular to the axial direction and is divided into an inner side and an outer side, and a circumferential direction indicates a direction along a circumference of a circle.

The sleeve 21 includes a through hole into which the shaft 10 is inserted and penetrating in an axial direction, and may be made of a sintered material, including a lubricant such as oil. A journal bearing may be formed between the outer peripheral surface of the shaft 10 and the inner peripheral surface of the sleeve 21 in order to support the rotation of the shaft 10 in a radial direction.

Further, a dynamic groove may be formed on at least one of the outer peripheral surface of the shaft 10 and the inner peripheral surface of the sleeve 21 in order to make the pressure of the oil constant in the journal bearing when the shaft 10 is rotated.

The thrust washer 22 may be disposed on the axial bottom portion of the shaft 10 and fixedly inserted into the central groove of the cover plate 23. A thrust bearing may be formed between the thrust washer 22 and the shaft 10 in order to support the rotation of the shaft 10 in an axial direction.

Referring to FIGS. 3 and 4, the bush 30 may be configured to include a body part 31 combined with the top outer peripheral surface of the shaft 10, an air flow spreading part 32 and a sealing part 33 formed on the bottom portion of the body 31, and a hollow part 34 penetrating the body part 31 in the axial direction so as to be inserted with the shaft 10.

The air flow spreading part 32 may be formed to be inclined upwardly toward the radial outer side so that an axial gap G between the bottom portion of the bush 30 and the top surface of the sleeve 21 is formed to be larger toward the radial outer side. That is, an outer-diameter axial gap G2 of the bush 30 may be formed to be larger than an inner-diameter axial gap G1 of the bush 31.

This may prevent air flow generated between the shaft and the sleeve from behaving unstably when the spindle motor is rotated, due to the reduced axial gap corresponding to the slimness of the spindle motor. That is, when the spindle motor is rotated, the air flow generated between the shaft 10 and the sleeve 21 moves along the air flow spreading part 32 and the air pressure is reduced toward the radial outer side due to the gradually increasing axial gap, such that the air flow behaves stably.

The air flow spread from the air flow spreading part 32 moves along the sealing part 33 and is discharged to the outside of the stator 50.

The air flow spreading part 32 may form a portion of an annular groove part formed on the bottom portion of the cylindrical bush 30 along a circumferential direction and at least one surface of the groove part may be formed to be inclined. The radial length of the air flow spreading part 32 may be substantially the same as the radial length of the sleeve 21.

That is, the outer diameter of the air flow spreading part 32 may be formed to coincide with the outer diameter of the sleeve 21.

The sealing part 33 extends from the radial outer side of the air flow spreading part 32 to the outer peripheral surface of a cylindrical wall part 41a of a rotor case 41 so as to prevent oil discharged from the sleeve made of a sintered material from being leaked due to a high-speed rotation of the spindle motor.

The sealing part 33 may be formed to be inclined downwardly toward the radial outer side, which may serve as a rigidity reinforcing part preventing oil from being leaked when the spindle motor is rotated and rigidity from being degraded due to the reduction in the thickness of the bush 30 corresponding to the slimness of the spindle motor.

In this case, the sealing part 33 may form a portion other than the air flow spreading part 32 in the groove part formed on the bottom portion of the cylindrical bush 30 along the circumferential direction. That is, the air flow spreading part 32 and the sealing part 33 may form both inclined surfaces of the groove part that is formed on the bottom part of the body part 31 in a circumferential direction and has an axial cross section of a reverse V-letter shape.

A first inclined surface formed to be inclined upwardly toward the radial outer side of the bush 30 may form the air flow spreading part 32 and a second inclined surface formed to be inclined downwardly toward the radial outer side from the first inclined surface may form the sealing part 33.

The first inclined surface forming the air flow spreading part 32 may be formed to be smaller than the second inclined surface forming the sealing part 33. In addition, the axial length of the second inclined surface may be formed to be longer than that of the first inclined surface.

The shaft 10 may be press-fitted in the hollow part 34. In this case, an adhesive may be applied between the shaft 10 and the bush 30.

The rotor assembly 40 may be configured to include the rotor case 41, a driving magnet 42, and a disk mounting part 43.

The rotor case 41 may be configured to include a first cylindrical wall part 41a protruded upwardly at the center thereof and combined with the outer peripheral surface of the bush 30, a disk part 41b extending to the radial outer side from the bottom end portion of the first cylindrical wall part 41a, and a second cylindrical wall part 41c protruded downwardly from the radial outer end of the disk part 41b.

The first cylindrical wall part 41a may be formed by bending the center of the rotor case 41 and the inner surface of the first cylindrical wall part 41a may be combined with the outer peripheral surface of the bush 30.

The top surface of the disk part 41b may be provided with a disk mounting part 43 in which a disk 70 is seated, and the bottom surface thereof may be provided with a suction magnet 45 formed to stably rotate the rotor assembly 40 by applying attraction between the disk part and a magnetic material of the stator assembly 50, and a stopper 44 locked to a latch 55 formed in a holder 51 so as to prevent the rotating member from being separated upwardly in an axial direction when the spindle motor is rotated.

The inner peripheral surface of the second cylindrical wall part 41c may be provided with an annular driving magnet 42 corresponding to a coil 54 of the stator assembly 50. The suction magnet 45 and the driving magnet 42 are permanent magnets generating magnetic force having a predetermined strength by alternately magnetizing an N pole and an S pole in a circumferential direction.

The stator assembly 50 may be configured to include the holder 51 combined with the outer peripheral surface of the sleeve 21 and fixedly supporting the spindle motor assembly, a plurality of cores 53 combined with the outer peripheral surface of the holder 51, and a coil 54 wound around the plurality of cores 53.

The bottom outer peripheral surface of the holder 51 may be combined with the base plate 52 and the top portion of the base plate 52 may be provided with a circuit board controlling the rotation driving of the spindle motor.

The top outer peripheral surface of the holder 51 may be provided with the latch 55 to which the stopper 44 for preventing the rotating members from separating in the axial direction when the spindle motor is rotated is locked.

The rotor assembly 40 is rotated by the electromagnetic interaction between the coil 54 and the driving magnet 42. In detail, when electricity is supplied to the coil 54 from the circuit board formed on the base plate 52, the plurality of cores 53 having the coil 54 wound therearound are magnetized and the rotor assembly 40 is rotated by the electromagnetic interaction with the driving magnet 42 opposite to the plurality of cores 53.

A chucking part 60, which removably combines the disk 70 with the spindle motor, may include an elastic member. The chucking part 60 is retrogressed to the radial inner side by deforming the elastic member due to a force applied to the chucking part 60 when the disk 70 is inserted into the chucking part 60 and then, fixes the disk 70 to the spindle motor by pressurizing the inner peripheral surface of the disk 70 due to the restoring force of the elastic member when the disk 70 is seated on the rotor case 41.

Figure 5:
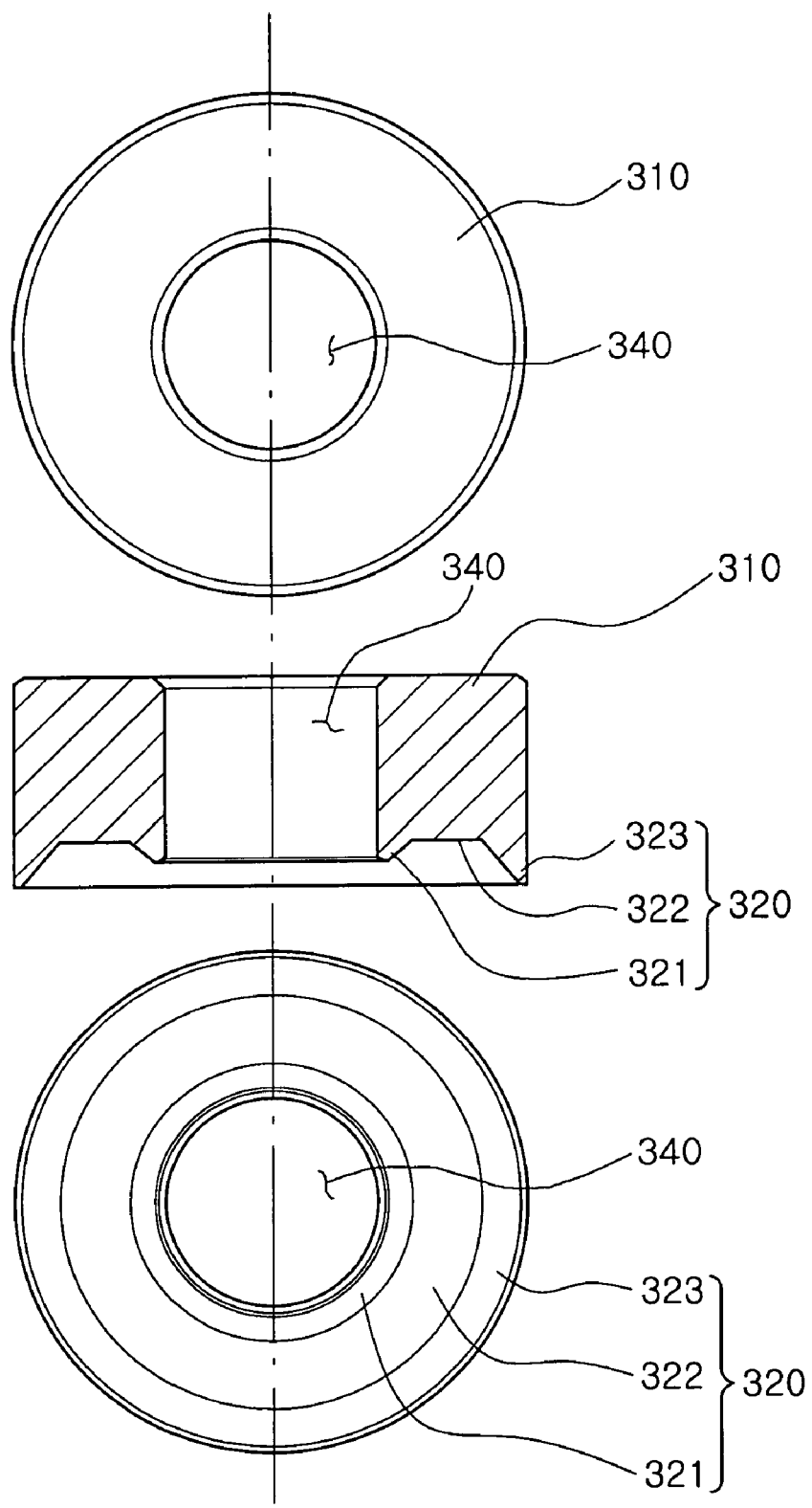
FIG. 5 illustrates a plan view, an axial cross-sectional view, and a bottom view showing a bush in a spindle motor according to a second exemplary embodiment of the present invention.
Figure 6:
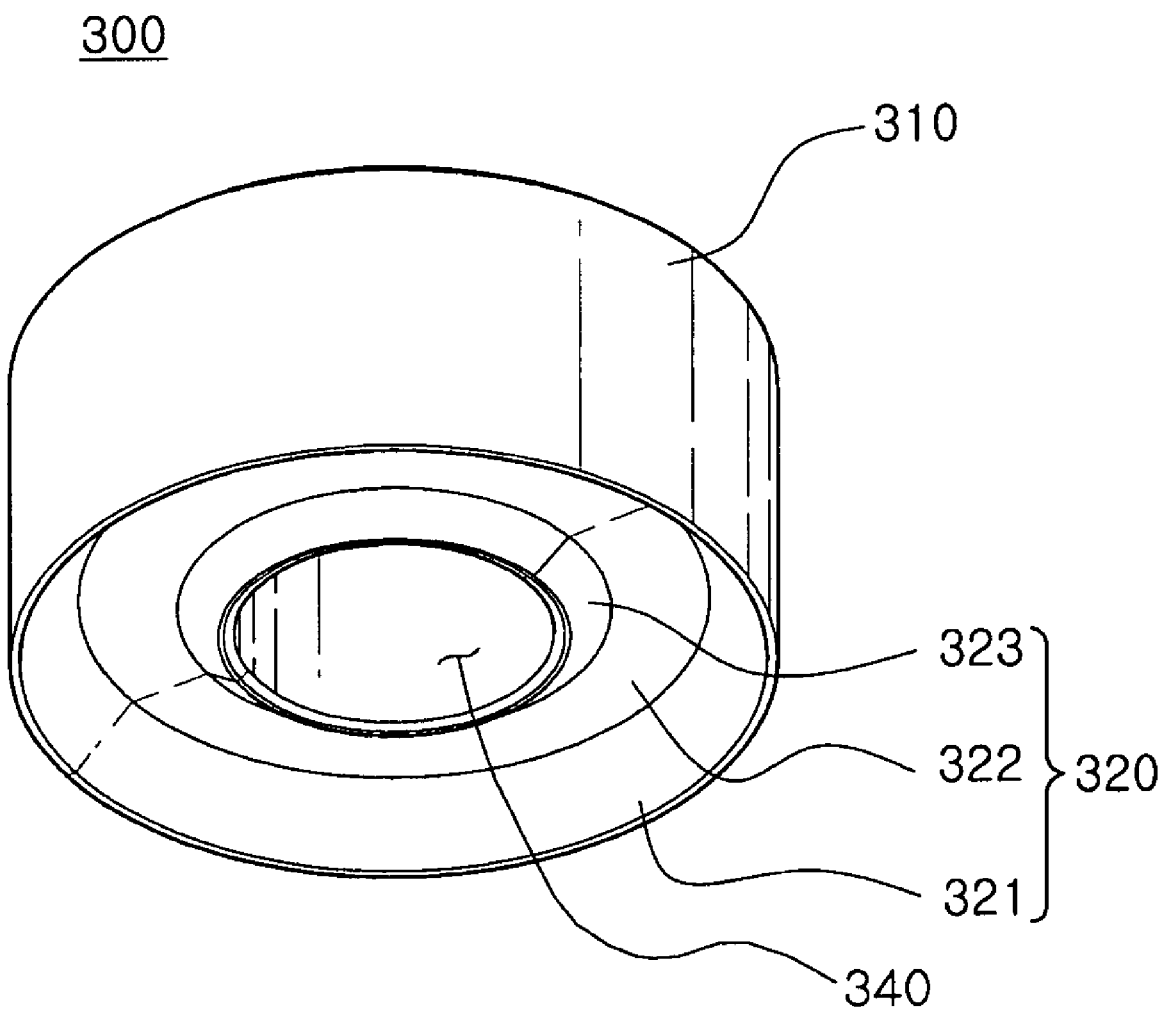
FIG. 6 is an upper perspective view of the bush in the spindle motor according to the second exemplary embodiment of the present invention.

FIG. 5 shows a plan view, an axial cross-sectional view, and a bottom view showing a bush in a spindle motor according to a second exemplary embodiment of the present invention and FIG. 6 is an upper perspective view of the bush.

A modified example of the bush of the spindle motor according to a second exemplary embodiment of the present invention shown in FIGS. 5 and 6 is shown. Other components are substantially the same as the spindle motor according to the first exemplary embodiment of the present invention shown in FIGS. 1 to 4, and therefore, the detailed description thereof will be omitted. Hereinafter, only the differences will mainly be described.

Referring to FIGS. 5 and 6, in the spindle motor according to the second exemplary embodiment of the present invention, a bush 300 may be configured to include a body part 310, a bottom part 320, and a hollow part 340, wherein the bottom part 320 may be configured to include a taper part 321, an air flow spreading part 322, and a sealing part 323.

The taper part 321 may be formed to be inclined downwardly toward the inner-diameter side of the body part 310, and the air flow spreading part 322 is formed between the taper part 321 and the sealing part 323 and the sealing part 323 may be formed to be inclined downwardly toward the outer-diameter side of the body part 310.

The bottom portion 320 of the bush 300 may have a shape of an annular groove part formed in a circumferential direction. In this configuration, the taper part 321 forms one side wall of the groove part and the air flow spreading part 322 may form the bottom surface of the groove part and the sealing part 323 may form other side wall of the groove part.

In this configuration, both side walls of the groove part may be formed to be inclined toward the inner-diameter side and the outer-diameter side of the bush 300, respectively. In this connection with the axial length of both side walls, the length of the side wall forming the sealing part 323 may be formed to be longer than that of the side wall forming the taper 321.

The taper part 321 may serve to reinforce the rigidity of the bush 300 with the reducing thickness corresponding to the slimness of the spindle motor and may facilitate the movement of the air flow generated between the shaft and the sleeve to the air flow spreading part 322.

Although the present exemplary embodiment shows and describes an example in which the air flow spreading part 322 is formed in parallel with the radial direction, the present invention is not limited thereto. The air flow spreading part 322 may be formed to be inclined toward the radial outer side.

Figure 7:
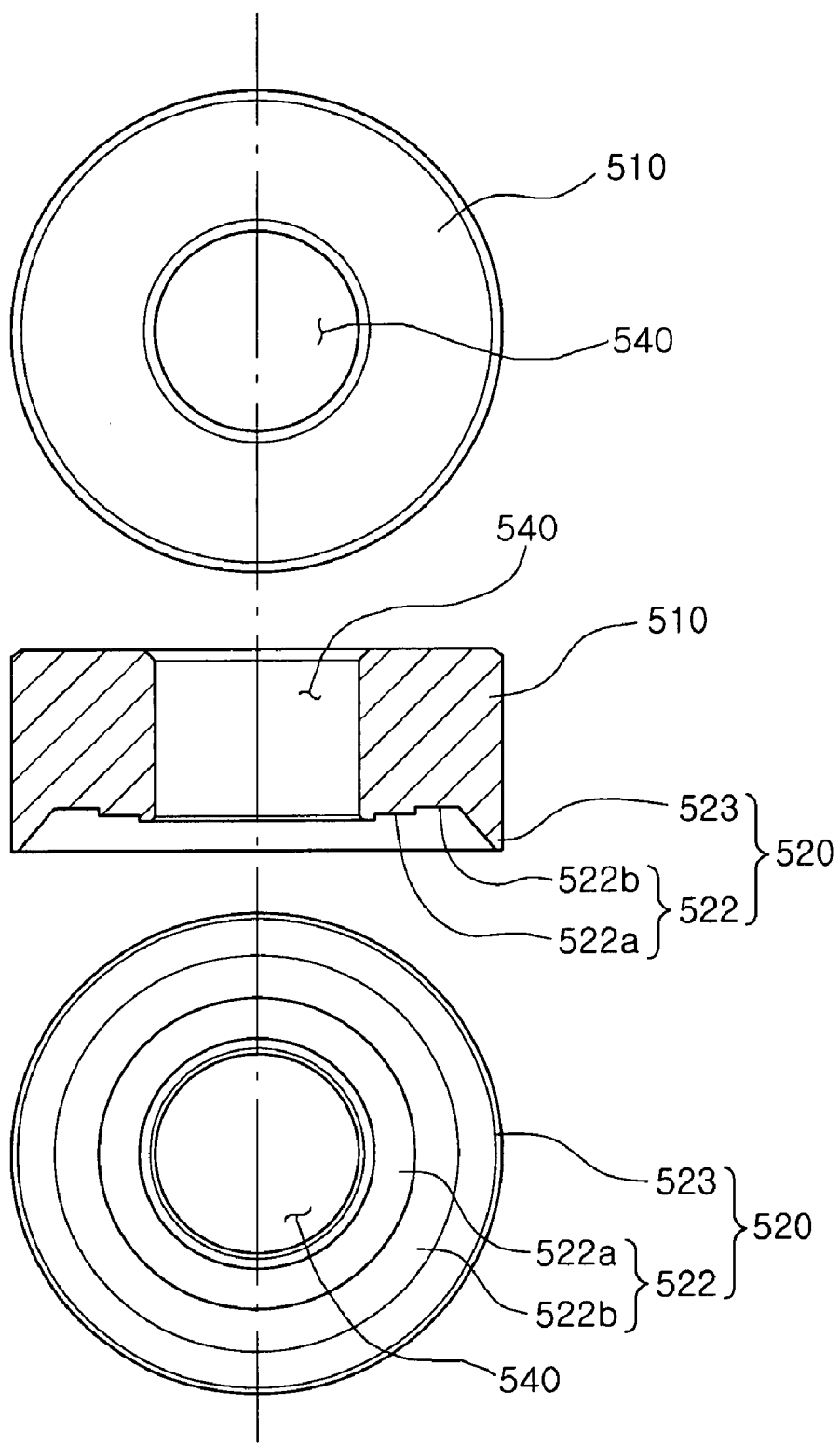
FIG. 7 illustrates a plan view, an axial cross-sectional view, and a bottom view showing a bush in the spindle motor according to a third exemplary embodiment of the present invention.
Figure 8:
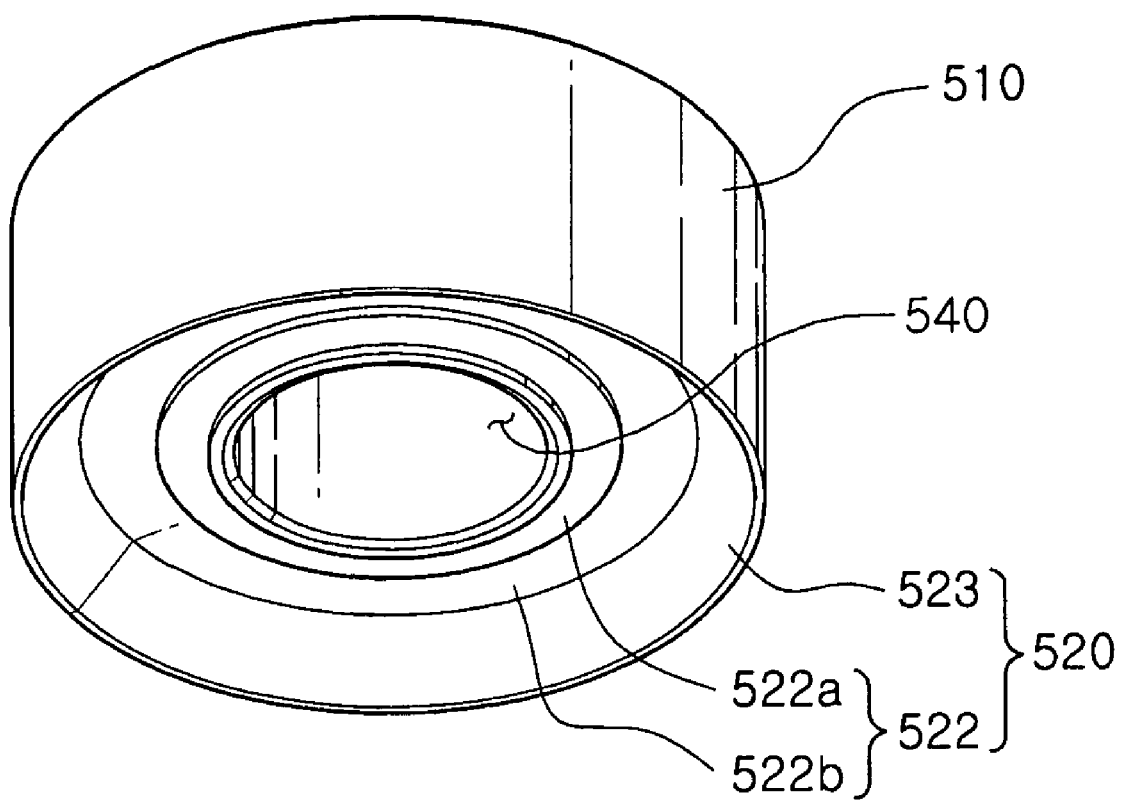
FIG. 8 is an upper perspective view of the bush in the spindle motor according to the third exemplary embodiment of the present invention.

FIG. 7 is a plan view, an axial cross-sectional view, and a bottom view showing a bush in a spindle motor according to a third exemplary embodiment of the present invention and FIG. 8 is an upper perspective view of the bush.

A modified example of the bush of the spindle motor according to a third exemplary embodiment of the present invention shown in FIGS. 7 and 8 is shown. Other components are substantially the same as the spindle motor according to the first exemplary embodiment of the present invention shown in FIGS. 1 to 4, and therefore, the detailed description thereof will be omitted. Hereinafter, only the differences will mainly be described.

Referring to FIGS. 7 and 8, in the spindle motor according to the third exemplary embodiment of the present invention, a bush 500 may be configured to include a body part 510, a bottom part 520, and a hollow part 540, wherein the bottom part 520 may be configured to include an air flow spreading part 522 and a sealing part 523.

The sealing part 523 may be formed to be tapered toward the outer peripheral surface of the bush 500.

The air flow spreading part 522 may be formed to be stepped toward the radial outer side and may include a first step part 522a and a second step part 522b.

The second step part 522b is formed at the radial outer side as compared to the first step part 522a, and the axial gap of the second step part 522b may be formed to be larger than the axial gap of the first step part 522a between it and the sleeve.

The bottom portion 320 of the bush 300 may have a shape of an annular groove part formed in a circumferential direction, wherein the groove part may be configured of an outer side wall and a bottom portion and the bottom portion may form the air flow spreading part 522 and the outer side wall may form the sealing part 523. In this case, the bottom portion is formed to be stepped to form the first step part 522a and the second step part 522b.

Figure 9:
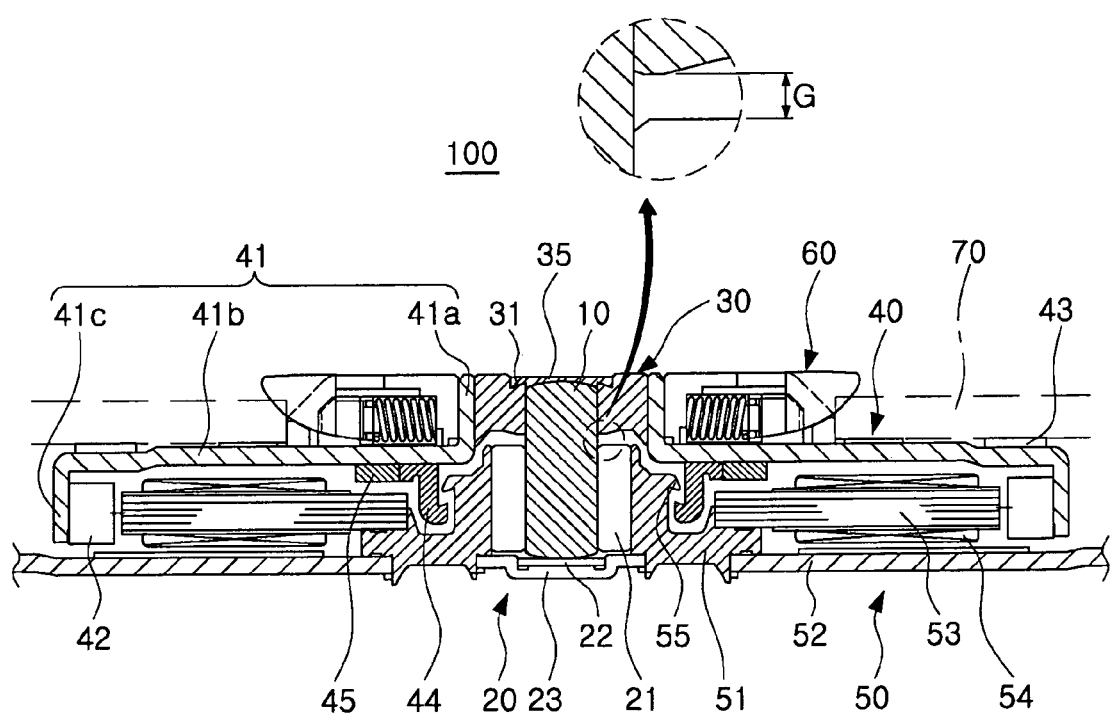
FIG. 9 is an axial cross-sectional view of a disk driver according to a fourth exemplary embodiment of the present invention.
Figure 10:
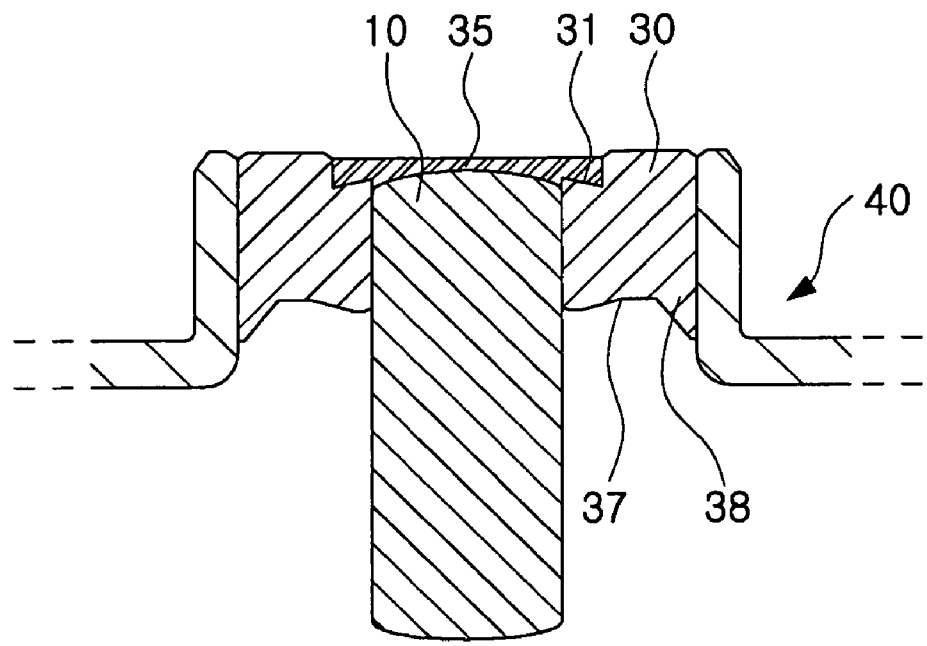
FIG. 10 is a partially enlarged view schematically showing rotating members in a spindle motor according to a fourth exemplary embodiment of the present invention.

FIG. 9 is an axial cross-sectional view of a disk driver according to a fourth exemplary embodiment of the present invention and FIG. 10 is a partially enlarged view schematically showing rotating members in a spindle motor according to a fourth exemplary embodiment of the present invention.

Referring to FIGS. 9 and 10, a disk driver 100 according to a fourth exemplary embodiment of the present invention may be configured to include spindle motor assembly acting as a rotational shaft, a rotor assembly 40, a stator assembly 50, and a chucking part 60.

The spindle motor assembly may be configured to include a shaft 10, a bush 30 combined with an outer peripheral surface of the shaft 10 and rotating together with the shaft 10, and a bearing part 20 rotatably supporting the shaft 10.

The shaft 10 is disposed on the same axis as a predetermined central axis and may be rotated based on a virtual rotation shaft when the spindle motor is rotated.

The bearing part 20 may be configured to include a cylindrical sleeve 21 rotatably supporting the shaft 10 in a radial direction, a thrust washer 22 disposed at the bottom side of the sleeve 21 and rotatably supporting the shaft 10 in a shaft direction, and a cover plate 23 covering the bottom portion of the sleeve 21 and the thrust washer 22

In this configuration, when defining a direction, an axial direction indicates a direction parallel with the central axis of the shaft 10 and is divided into a top portion and a bottom portion, a radial direction indicates a direction vertical to the axial direction and is divided into an inner side and an outer side, and a circumferential direction indicates a direction along a circumference of a circle.

The sleeve 21 include a through hole into which the shaft is inserted and penetrating in an axial direction and may be made of a sintered material, including a lubricant such as oil. A journal bearing may be formed between the outer peripheral surface of the shaft 10 and the inner peripheral surface of the sleeve 21 in order to support the rotation of the shaft 10 in a radial direction.

Further, a dynamic groove may be formed on at least one of the outer peripheral surface of the shaft 10 and the inner peripheral surface of the sleeve 21 in order to make the pressure of the oil constant in the journal bearing when the shaft 10 is rotated.

The thrust washer 22 may be disposed on the axial bottom portion of the shaft 10 and fixedly inserted into the central groove of the cover plate 23. The thrust bearing may be formed between the thrust washer 22 and the shaft 10 in order to support the rotation of the shaft 10 in an axial direction.

The inner-diameter side of the bush 30 may be configured to include the groove part 31 formed in a circumferential direction and the bush 30 may include the air flow spreading part 37 and the sealing part 38 formed on the axial bottom portion. The bush 30 may be formed by cutting metal materials having good machinability.

The groove part 31 may be formed so that one side thereof is opened to the outer peripheral surface of the shaft 10 and the bottom portion of the groove part 31 may be formed to be inclined by a predetermined angle in a radial direction.

The groove part 31 forms a filling groove 35 together with the top surface of the shaft 10 and a bonding material may be filled in the filling groove 35. In the filling groove 35 of FIGS. 1 and 2, the hatched portion indicates the portion in which the bonding material is filled.

In the fourth exemplary embodiment, the bonding material may have a bonding structure including both the peeling-resistance strength of the bonding interface and the shear strength of the bonding material. The bonding material is provided on the top surface of the shaft 10 and filled in the groove part 31 on the inner-diameter side of the bush 30, thereby making it possible to improve the adhesion between the bush 30 and the shaft 10 and prevent the bonding material from overflowing to the outside of the filling groove 35.

The air flow spreading part 37 may be formed to be inclined upwardly toward the radial outer side so that an axial gap G between the bottom portion of the bush 30 and the top surface of the sleeve 21 is formed to be larger toward the radial outer side.

When the spindle motor is rotated, the air flow generated between the shaft 10 and the sleeve 21 moves along the air spreading part 37 and the air pressure is reduced toward the radial outer side due to the gradually increasing axial gap, such that the air flow is stably operated.

The air flow spread from the air flow spreading part 37 moves along the sealing part 38 and is discharged to the outside of the stator 50.

The sealing part 38 extends from the radial outer side of the air flow spreading part 37 to the outer peripheral surface of a cylindrical wall part 41a of a rotor case 41 so as to prevent oil discharged from the sleeve made of a sintered material from being leaked due to a high-speed rotation of the spindle motor.

The sealing part 38 may be formed to be inclined downwardly toward the radial outer side, which may serve as a rigidity reinforcing part preventing oil from being leaked when the spindle motor is rotated and rigidity from being degraded due to the reduction in the thickness of the bush 30 corresponding to the slimness of the spindle motor.

The rotor assembly 40 may be configured to include the rotor case 41, a driving magnet 42, and a disk mounting part 43.

The rotor case 41 may be configured to include a first cylindrical wall part 41a protruded upwardly at the center thereof and combined with the outer peripheral surface of the bush 30, a disk part 41b extending to the radial outer side from the bottom end portion of the first cylindrical wall part 41a, and a second cylindrical wall part 41c protruded downwardly from the radial outer end of the disk part 41b.

The first cylindrical wall part 41a may be formed by bending the center of the rotor case 41 and the inner surface of the first cylindrical wall part 41a may be combined with the outer peripheral surface of the bush 30.

The top surface of the disk part 41b may be provided with a disk mounting part 43 in which a disk 70 is seated, and the bottom surface thereof may be provided with a suction magnet 45 formed to stably rotate the rotor assembly 40 by applying attraction between the disk part and a magnetic material of the stator assembly 50, and a stopper 44 locked to a latch 55 formed in a holder 51 so as to prevent the rotating member from separating upwardly in an axial direction when the spindle motor is rotated.

The inner peripheral surface of the second cylindrical wall part 41c may be provided with an annular driving magnet 42 corresponding to a coil 54 of the stator assembly 50. The suction magnet 45 and the driving magnet 42 are permanent magnets generating magnetic force of a predetermined strength by alternately magnetizing an N pole and an S pole in a circumferential direction.

The stator assembly 50 may be configured to include the holder 51 combined with the outer peripheral surface of the sleeve 21 and fixedly supporting the spindle motor assembly, a plurality of cores 53 combined with the outer peripheral surface of the holder 51, and a coil wound around the plurality of cores 53.

The bottom outer peripheral surface of the holder 51 may be combined with the base plate 52 and the top portion of the base plate 52 may be provided with a circuit board controlling the rotation driving of the spindle motor.

The top outer peripheral surface of the holder 51 may be provided with the latch 55 to which the stopper 44 for preventing the rotating members from separating in the axial direction when the spindle motor is rotated is locked.

The rotor assembly 40 is rotated by the electromagnetic interaction between the coil 54 and the driving magnet 42. In detail, when electricity is supplied to the coil 54 from the circuit board formed on the base plate 52, the plurality of cores 53 having the coil 54 wound therearound are magnetized and the rotor assembly 40 is rotated by the electromagnetic interaction with the driving magnet 42 opposite to the plurality of cores 53.

A chucking part 60, which removably combines the disk 70 with the spindle motor, may include an elastic member. The chucking part 60 is retrogressed to the radial inner side by deforming the elastic member due to a force applied to the chucking part 60 when the disk 70 is inserted into the chucking part 60 and then, fixes the disk 70 to the spindle motor by pressurizing the inner peripheral surface of the disk 70 due to the restoring force of the elastic member when the disk 70 is seated on the rotor case 41.

Figure 11:
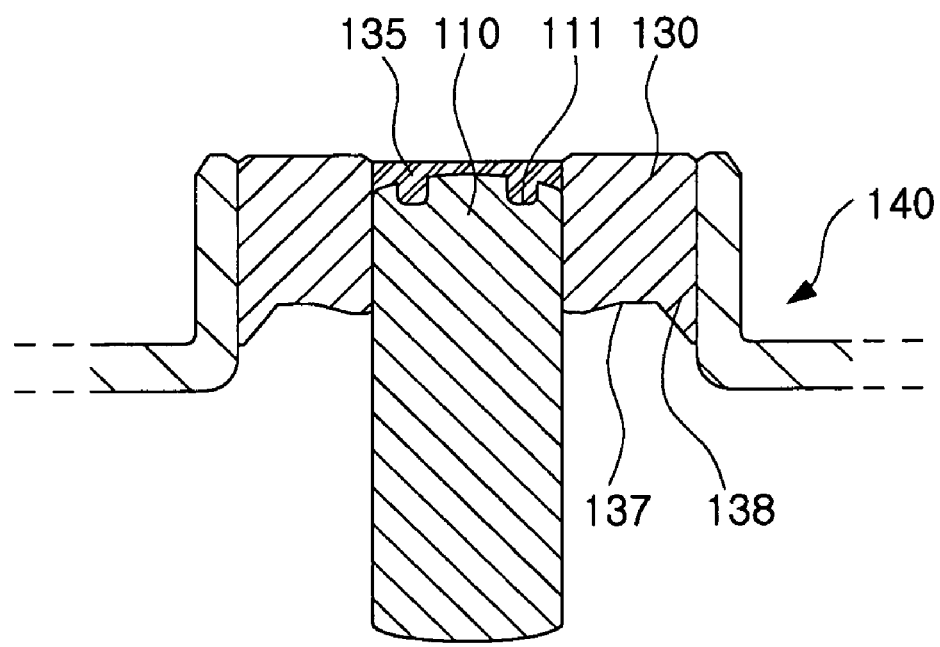
FIG. 11 is a partially enlarged view schematically showing rotating members in a spindle motor according to a fifth exemplary embodiment of the present invention.

FIG. 11 is a partially enlarged view schematically showing rotating members in a spindle motor according to a fifth exemplary embodiment of the present invention.

A modified example of the filling groove of the spindle motor according to a fifth exemplary embodiment of the present invention shown in FIG. 11 is shown. Other components are substantially the same as the spindle motor according to the fourth exemplary embodiment of the present invention shown in FIGS. 9 to 10, and therefore, the detailed description thereof will be omitted. Hereinafter, only the differences will mainly be described.

Referring to FIG. 11, in the spindle motor according to the fifth exemplary embodiment of the present invention, the shaft 110 may include a groove part 111 formed on the outer-diameter side in a circumferential direction. The groove part 11 may have an annular groove shape. The groove part 111 may have side walls formed in parallel with each other The groove part 111 forms a filling groove 135 together with the top portion of the shaft 110 surrounded by the wall portion on the inner-diameter side, and the bonding material may be filled in the filling groove 135. In the filling groove 135 of FIG. 3, the hatched portion indicates the portion in which the bonding material is filled.

In the fifth exemplary embodiment, the bonding material is made of a material both having the peeling-resistance strength of the bonding interface and the shear strength of the bonding material. The bonding material is provided on the top portion of the shaft 110 surrounded by the wall portion on the inner-diameter side of the bush 30, thereby making it possible to improve the adhesion between the bush 130 and the shaft 110. In addition, in the fifth exemplary embodiment, it is possible to prevent the bonding material from overflowing to the outside of the filling groove 135 by the groove part 111 formed on the top portion of the shaft 110.

Figure 12:
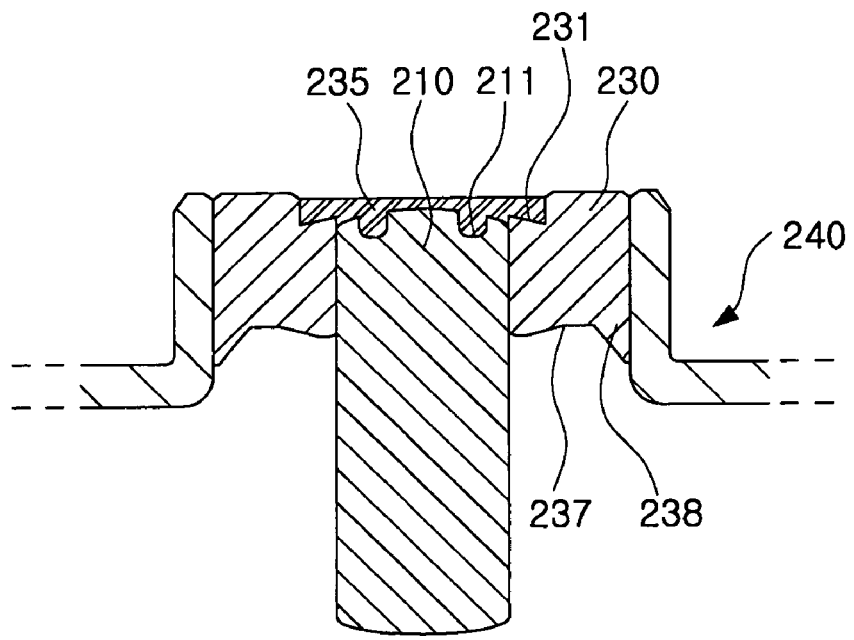
FIG. 12 is a partially enlarged view schematically showing rotating members in a spindle motor according to a sixth exemplary embodiment of the present invention.
Figure 13:
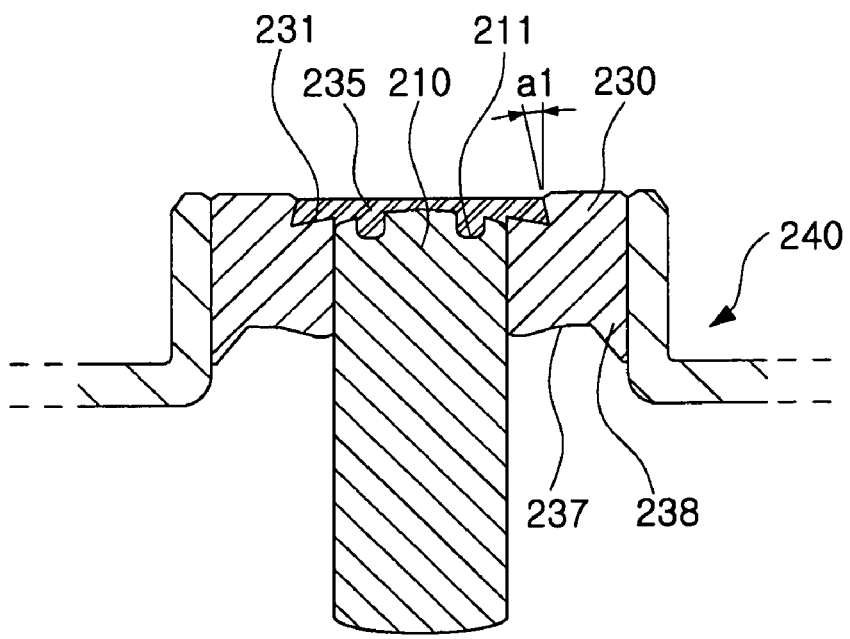
FIG. 13 is a partially enlarged view showing a first modified example of a bush in the spindle motor according to the sixth exemplary embodiment of the present invention.
Figure 14:
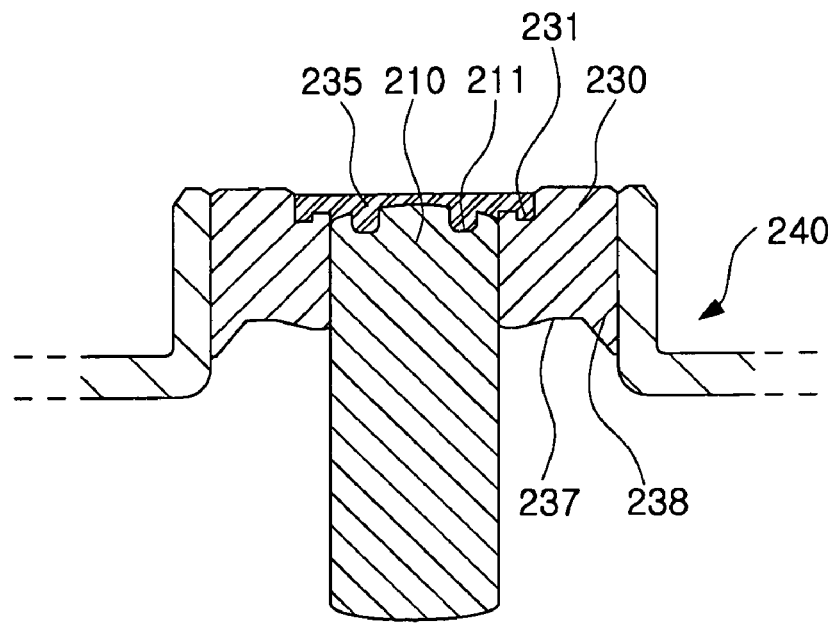
FIG. 14 is a partially enlarged view showing a second modified example of a bush in the spindle motor according to the sixth exemplary embodiment of the present invention.
Figure 15:
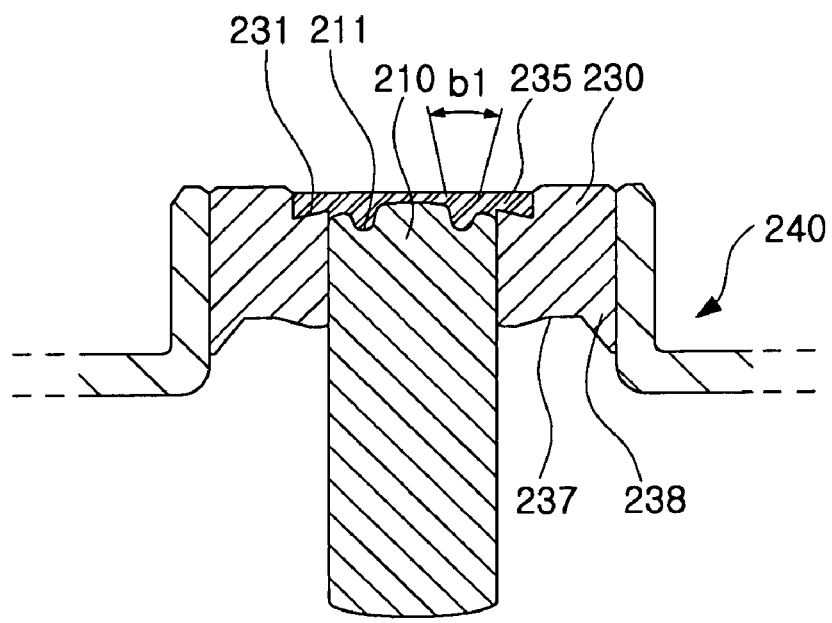
FIG. 15 is a partially enlarged view showing a first modified example of a shaft in the spindle motor according to the sixth exemplary embodiment of the present invention.
Figure 16:
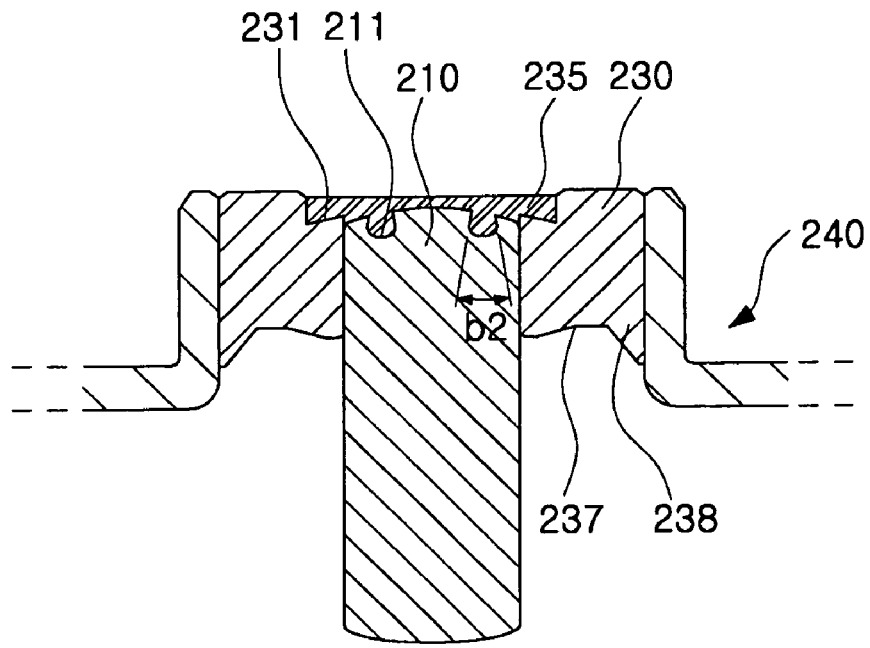
FIG. 16 is a partially enlarged view showing a second modified example of the shaft in the spindle motor according to the sixth exemplary embodiment of the present invention.
Figure 17:
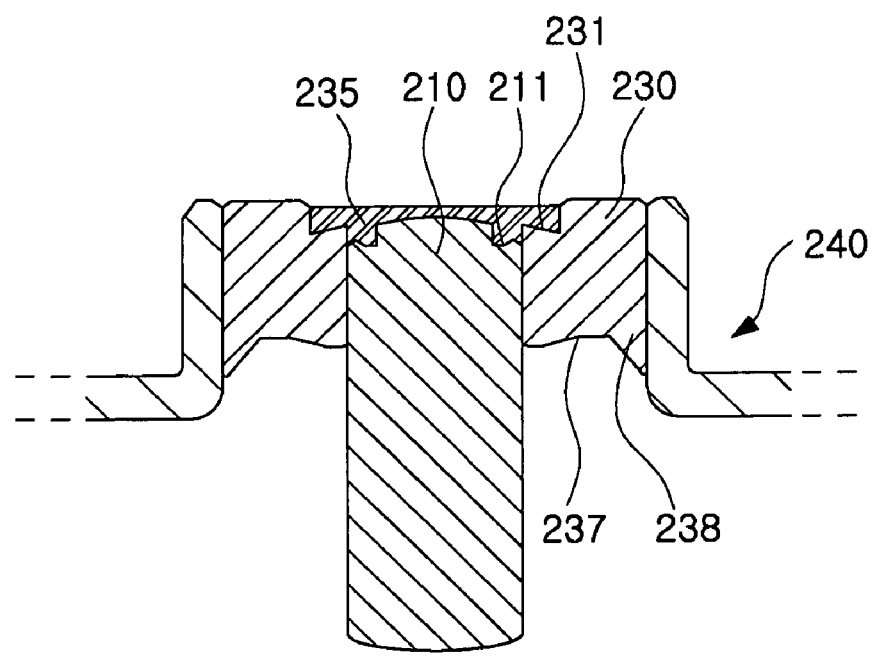
FIG. 17 is a partially enlarged view showing a third modified example of the shaft in the spindle motor according to the sixth exemplary embodiment of the present invention.

FIG. 12 is a partially enlarged view schematically showing rotating members in a spindle motor according to a sixth exemplary embodiment of the present invention, FIGS. 13 and 14 each are partially enlarged views showing first and second modified examples of the bush, and FIGS. 15 to 17 are partially enlarged views showing first to third modified examples of the shaft.

The spindle motor according to the sixth exemplary embodiment of the present invention shown in FIG. 12 shows a state in which the bush structure of the fourth exemplary embodiment and the shaft structure of the fifth exemplary embodiment are merged, and the spindle motor according to the sixth exemplary embodiment of the present invention shown in FIGS. 13 to 17 shows the modified examples of the bush or the shaft in FIG. 12. Other components are substantially the same as the spindle motor according to the fourth exemplary embodiment of the present invention shown in FIGS. 9 and 10 and therefore, the detailed description thereof will be described. Hereinafter, only the differences will mainly be described.

Referring first to FIG. 12, in the spindle motor according to the sixth exemplary embodiment of the present invention, the shaft 210 may include a first groove part 211 formed on the outer-diameter side in a circumferential direction, and a bush 230 may include a second groove part 231 formed on the inner-diameter side in a circumferential direction and an air flow spreading part 238 and a sealing part 238 formed on the axial bottom portion.

A filling groove 235 may be formed by the top portion of the shaft 210 including the first groove part 211 and the outer wall portion of the second groove part 231. The bonding material may be filled in the filling groove 235. In the filling groove 135 of FIG. 12, the hatched portion indicates the portion in which the bonding material is filled.

The bonding material may have a bonding structure including both the peeling resistance strength of the bonding interface and the shear strength of the bonding material. The bonding material is filled in the filling groove 235, thereby improving the adhesion between the bush 230 and the shaft 210. In addition, the space in which the bonding material is filled is expanded by the first groove part 211 and the second groove part 231, thereby preventing the bonding material from overflowing to the outside of the filling groove 235.

Referring to FIG. 13, in the first modified example of the bush of the spindle motor according to the sixth exemplary embodiment of the present invention, the outer wall portion of the second groove part 231 may be formed to be inclined by a predetermined angle a1 in an axial direction. In this configuration, it is possible to improve the adhesion between the bush 230 and the shaft 210 as well as further definitively prevent the bonding material from overflowing than the case in which the second groove 231 is not inclined in an axial direction as in FIG. 12.

Referring to FIG. 14, in the second modified example of the bush of the spindle motor according to the sixth exemplary embodiment of the present invention, the bottom portion of the second groove part 21 may be formed to be stepped. The bonding material is filled in the stepped portion, thereby improving the adhesion between the bush 230 and the shaft 210 and effectively preventing the bonding material from overflowing.

Referring to FIG. 15, in the first modified example of the shaft of the spindle motor according to the sixth exemplary embodiment of the present invention, the first groove part 211 may be formed to be expanded toward the axial top portion. Both side walls of the first groove part 211 may be formed to be inclined by an angle b1 toward the axial top portion. In this configuration, the space of the first groove part 211 is further expanded than the case in which the first groove part 211 is not inclined, thereby improving the adhesion between the bush 230 and the shaft 210 and effectively preventing the bonding material from overflowing.

Referring to FIG. 16, in the second modified example of the shaft of the spindle motor according to the sixth exemplary embodiment of the present invention, the first groove part 211 may be formed to be expanded toward the axial bottom portion. Both side walls of the first groove part 211 may be formed to be inclined by an angle b2 toward the axial bottom portion. In this configuration, the space of the first groove part 211 is further expanded than the case in which the first groove part 211 is not inclined, thereby improving the adhesion between the bush 230 and the shaft 210, and effectively preventing the bonding material from overflowing since the opening side of the first groove part 211 is narrower.

Referring to FIG. 17, in the third modified example of the shaft of the spindle motor according to the sixth exemplary embodiment of the present invention, one side of the first groove part 211 may be formed to be opened to the inner peripheral side of the bush 230. This may facilitate the machining of the first groove part 211 on the shaft 210.

Figure 18A:
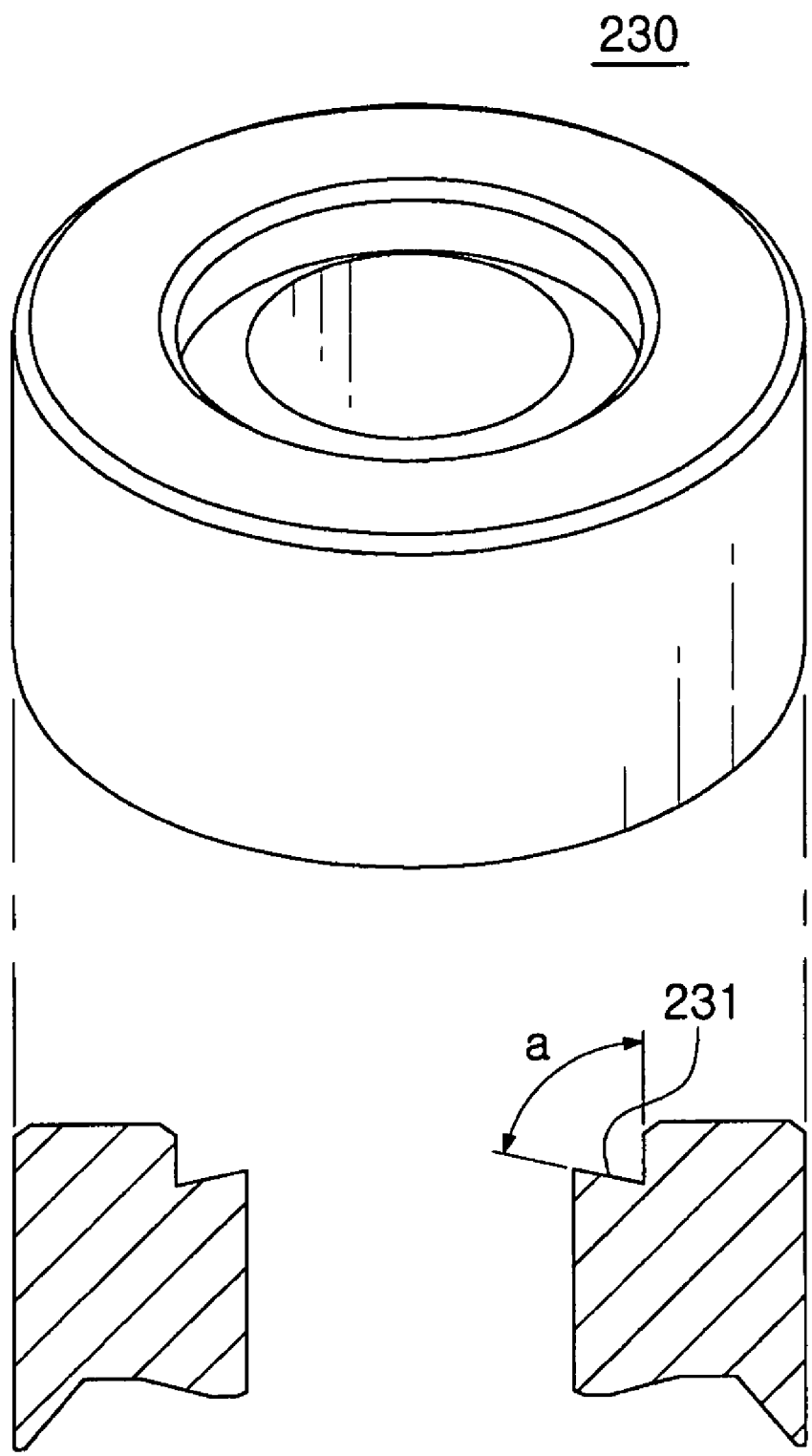
FIGS. 18A to 18C are perspective views and axial cross-sectional views showing various shapes of the bush in the spindle motor according to the fourth to sixth exemplary embodiments of the present invention.
Figure 18B:
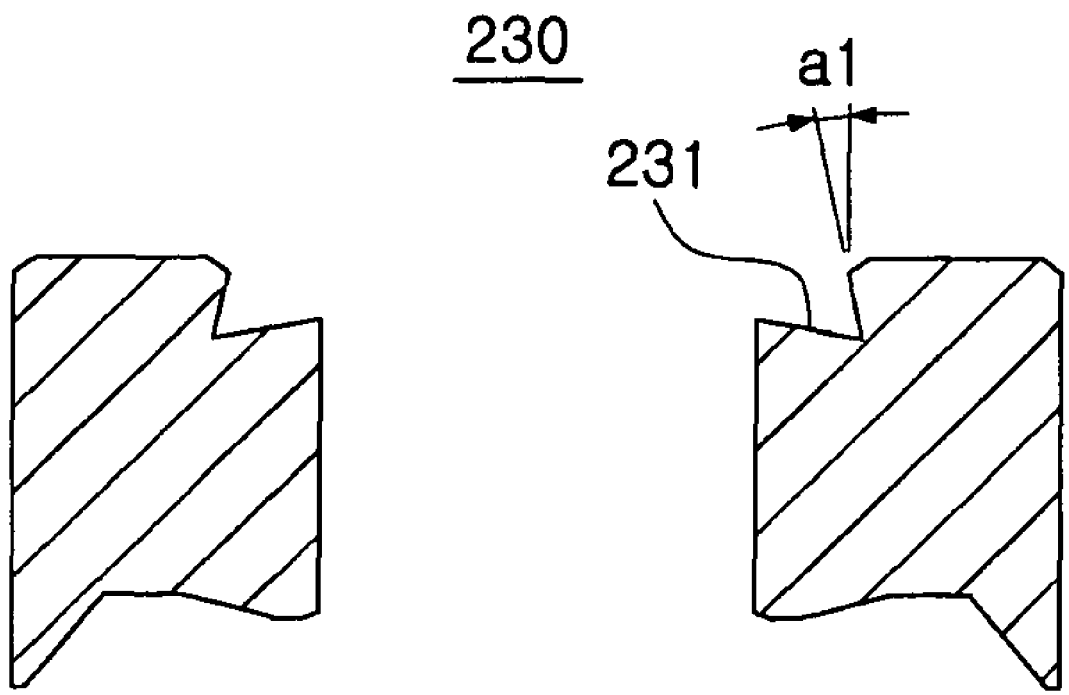
Figure 18C:
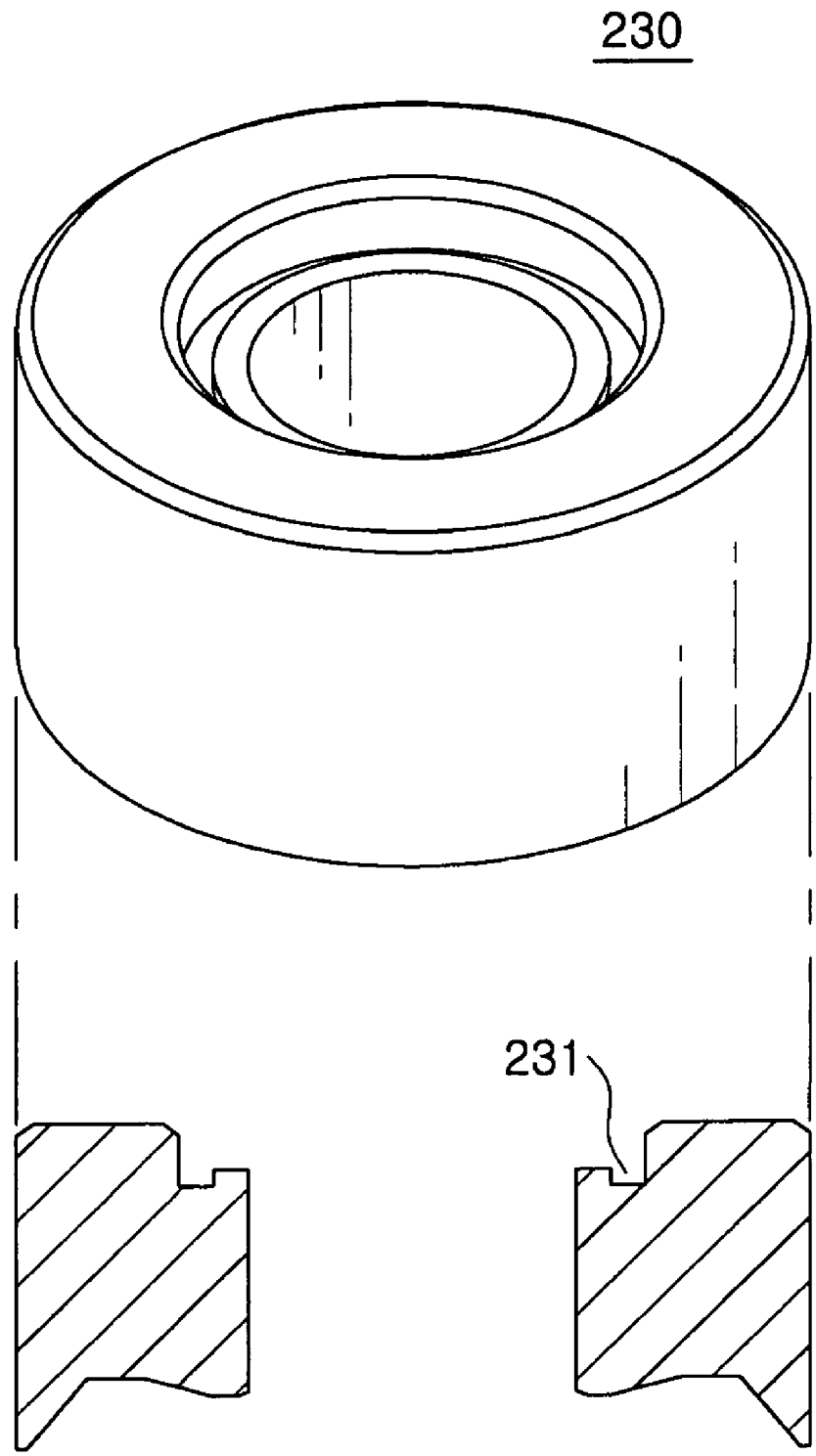
Figure 19A:
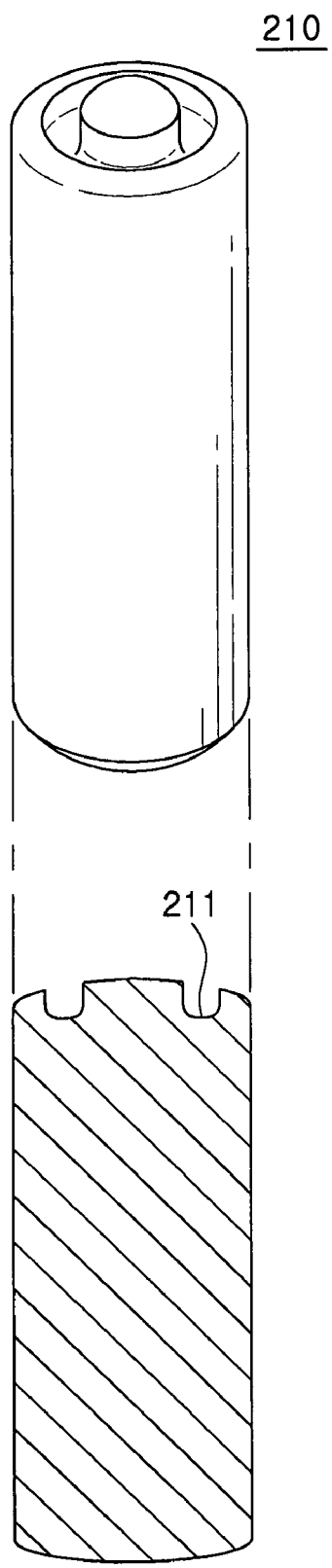
FIGS. 19A to 19D are perspective views and axial cross-sectional views showing various forms of the shaft in the spindle motor according to the fourth to sixth exemplary embodiments of the present invention.
Figure 19B:
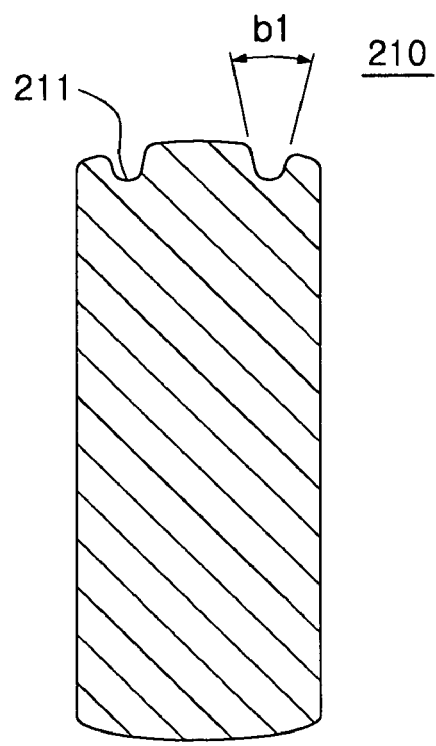
Figure 19C:
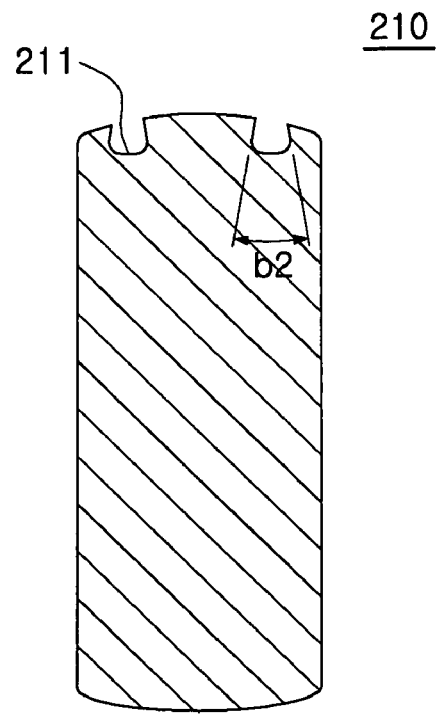
Figure 19D:
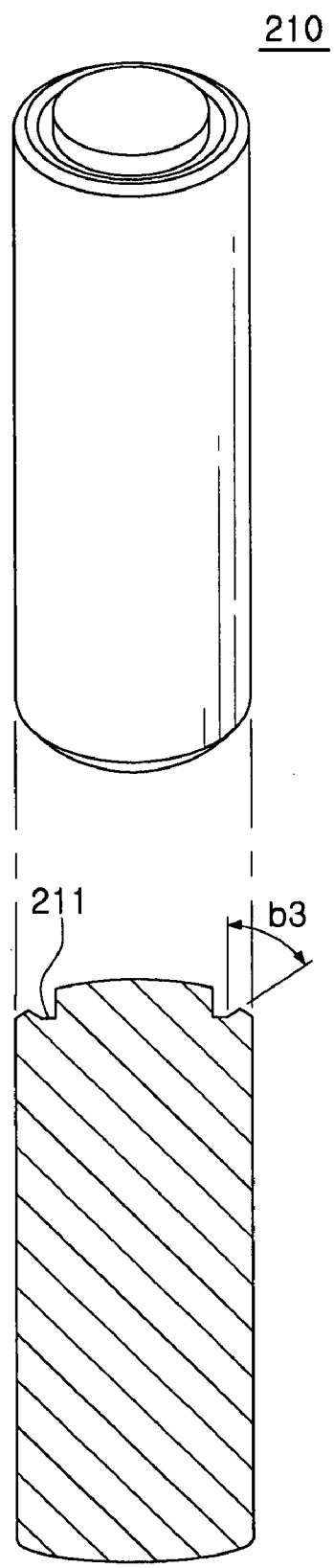

FIGS. 18A to 18C are a perspective view and an axial cross-sectional view showing various shapes of the bush in the spindle motor according to the fourth to sixth exemplary embodiments of the present invention and FIGS. 19 to 19D show a perspective view and an axial cross-sectional view showing various forms of the shaft in the spindle motor according to the fourth to sixth exemplary embodiments of the present invention.

Referring first to FIGS. 18A to 18C, various shapes of the bush 230 will be described. As shown in FIG. 18A, the second groove part 231 formed on the inner-diameter side of the bush 230 in a circumferential direction has a shape opened to the shaft side, and may be formed to allow an angle 'a' formed by the sidewall and bottom portion of the second groove part 231 to form an acute angle.

The second groove part 231 of the bush 230 shown in FIG. 18B may have a side wall formed to be inclined by an angle 'a1' with respect to the axial direction.

In addition, the bottom portion of the second groove part 231 of the bush 230 shown in FIG. 18C may be formed to be stepped.

Next, referring to FIGS. 19A to 19D, various shapes of the shaft 210 will be described. As shown in FIG. 19A, a portion spaced by a predetermined interval from the outer diameter of the shaft 210 on the top portion of the shaft 210 is provided with the first groove part 211 having a predetermined depth from the top surface of the shaft 210 toward the axial bottom portion in a circumferential direction. In this case, both side walls of the first groove part 211 may be formed in parallel with each other.

The first groove part 211 shown in FIG. 19B may be formed to be expanded toward the axial top portion and both side walls of the first groove part 211 may be formed to be inclined to form an angle b1.

The first groove part 211 shown in FIG. 19C may be formed to be expanded toward the axial bottom portion and both side walls of the first groove part 211 may be formed to be inclined to form an angle b2.

The first groove part 211 shown in FIG. 19D may be formed by cutting the top portion of the shaft 210 along the circumferential direction from the outer peripheral side. In this case, the bottom portion of the first groove part 211 may be formed to be inclined by an angle b3 to be easily received in the first groove part 211.

Figure 20A:
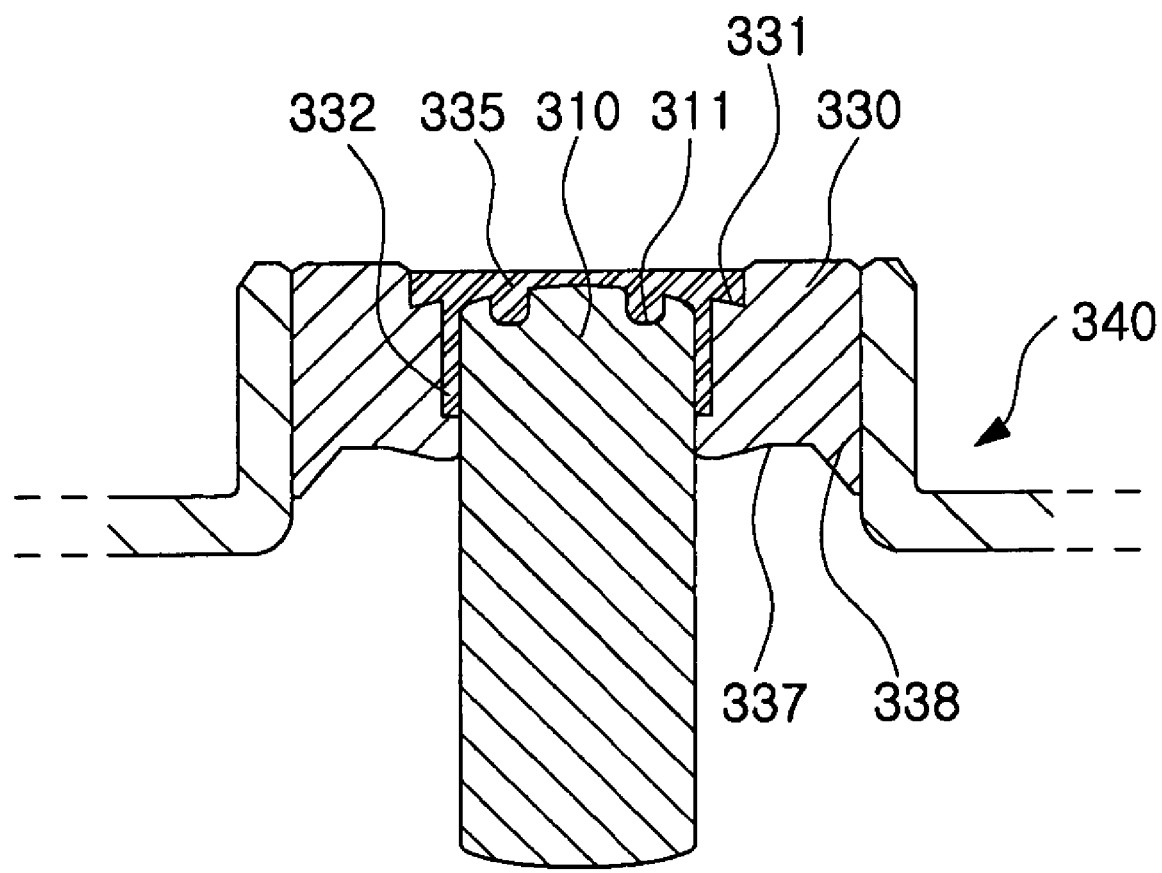
FIG. 20A is a partially enlarged view schematically showing rotating members in a spindle motor according to a seventh exemplary embodiment of the present invention.
Figure 20B:
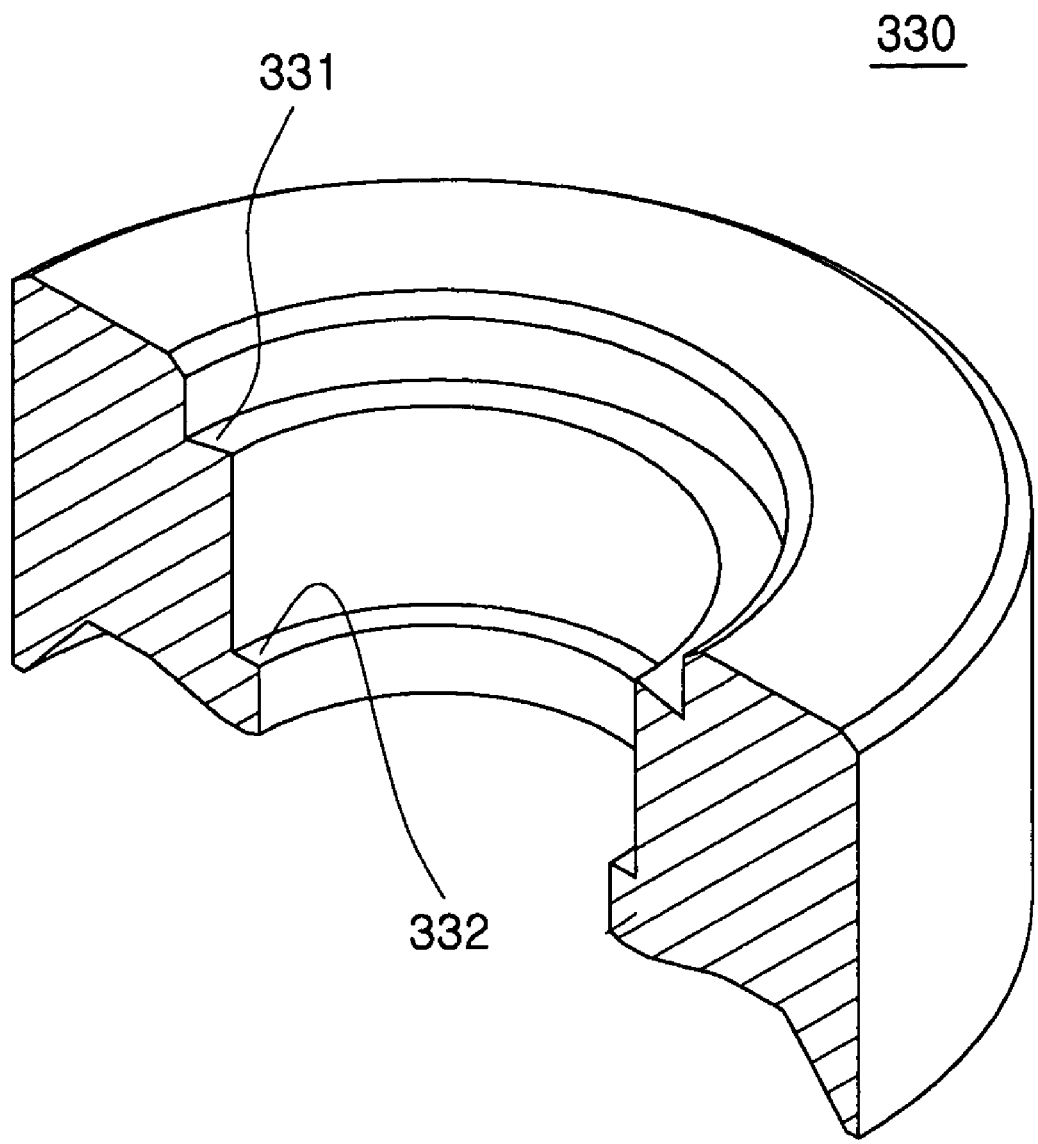
FIG. 20B is a partially cut-away perspective view showing the bush shape.

FIG. 20A is a partially enlarged view schematically showing rotating members in a spindle motor according to a seventh exemplary embodiment of the present invention, FIG. 20B is a partially cut-away perspective view showing the bush shape.

Figure 21A:
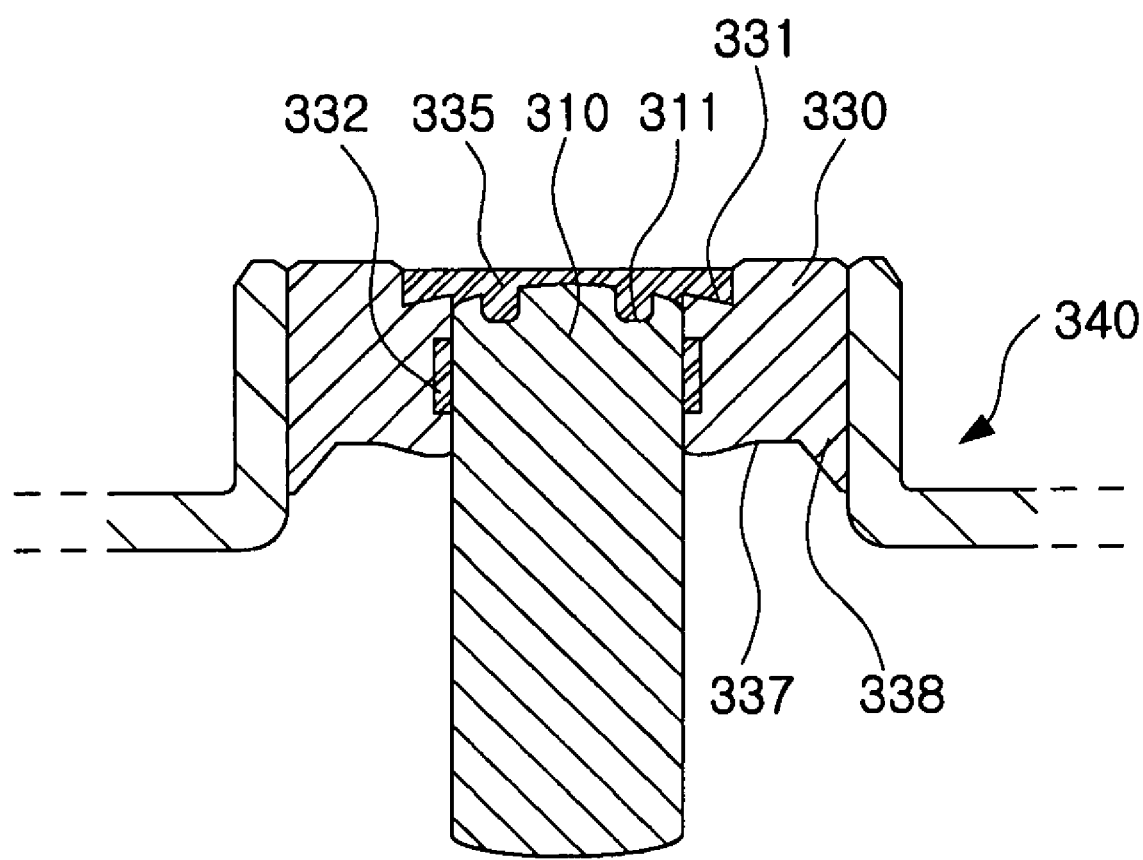
FIG. 21A is a partially enlarged view showing a modified example of the bush in a spindle motor according to the seventh exemplary embodiment of the present invention.
Figure 21B:
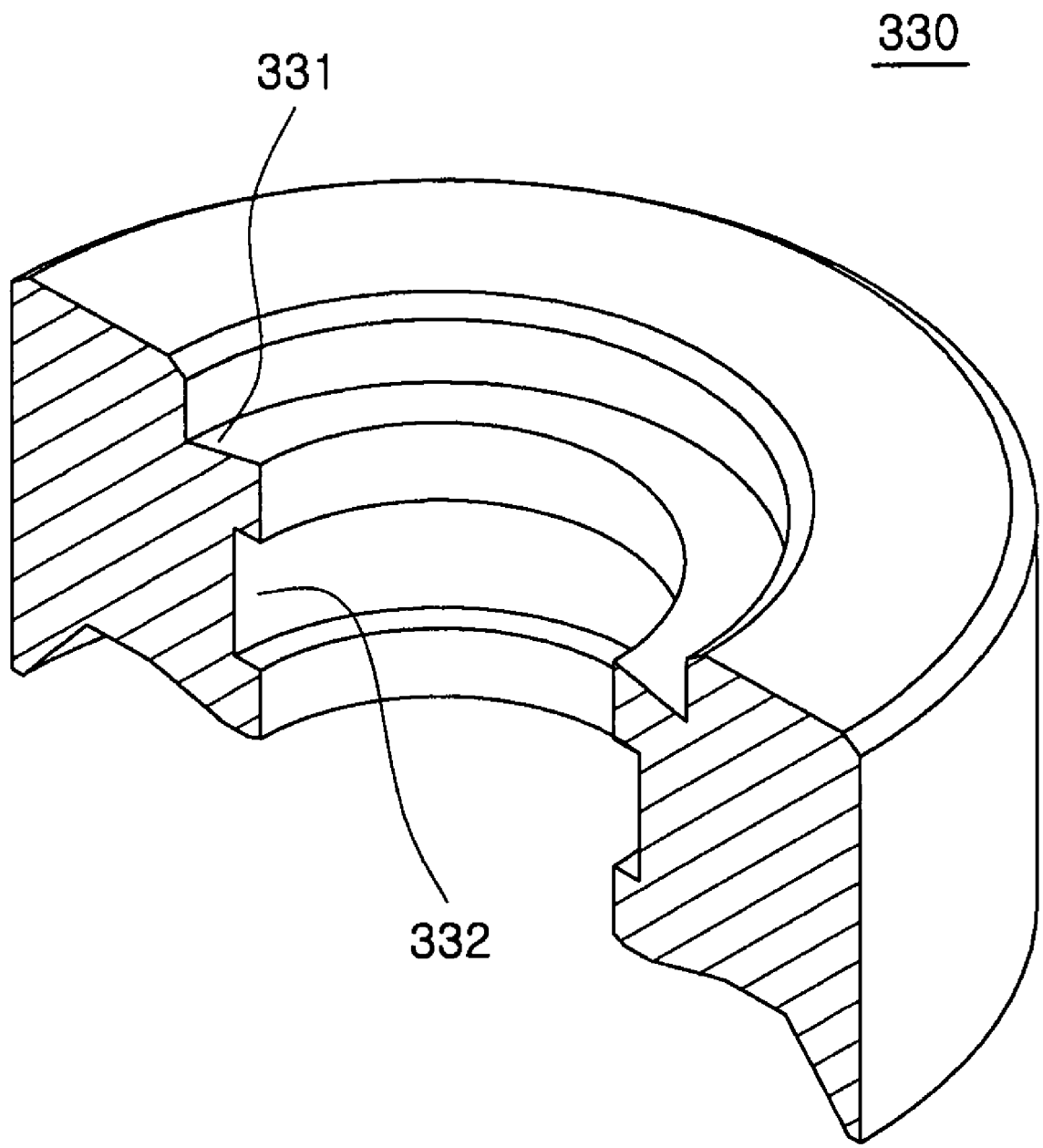
FIG. 21B is a partially cut-away perspective view showing the bush shape.

FIG. 21A is a partially enlarged view showing a modified example of the bush in a spindle motor according to a seventh exemplary embodiment of the present invention, and FIG. 21B is a partially cut-away perspective view showing the bush shape.

The spindle motor according to a seventh exemplary embodiment of the present invention shown in FIGS. 20A and 20B forms a third groove part between the inner peripheral surface of the bush and the outer peripheral surface of the shaft. Other components are substantially the same as the spindle motor according to the fourth exemplary embodiment of the present invention shown in FIG. 12, and therefore, the detailed description thereof will be omitted. Hereinafter, only the differences will mainly be described.

Referring first to FIGS. 20A and 20B, in the spindle motor according to the seventh exemplary embodiment of the present invention, the shaft 310 may include a first groove part 311 formed on the outer-diameter side in a circumferential direction, and the bush 330 may include a second groove part 331 formed on the inner-diameter side in a circumferential direction, the third groove part 332 formed to be extended on the inner peripheral surface in an axial direction, and the air flow spreading part 337 and the sealing part 338 formed on the axial bottom portion.

The third groove part 332 may be formed to communicate with the second groove part 331 and may have a deep groove shape formed to be extended to the axial bottom portion from the bottom portion of the second groove part 331.

The filling groove 335 may be formed by the top portion of the shaft 310 including the first groove part 311 and the outer wall portion of the second groove part 331 and the third groove part 332. The bonding material may be filled in the filling groove 335. In the filling groove 335 of FIG. 20A, the hatched portion indicates the portion in which the bonding material is filled.

According to the seventh exemplary embodiment of the present invention, the filling groove 335 is formed between the top portion of the shaft 310 and the inner-diameter side of the bush 330 and between the outer peripheral surface of the shaft 310 and the inner peripheral surface of the bush 330, thereby ensuring a firmer connection between the shaft 310 and the bush 330 by the bonding material filled in the filling groove 335.

FIGS. 21A and 21B show the modified example of the third groove part 332 of FIG. 20. The third groove part 332 does not communicate with the second groove part 331 and is depressed by a predetermined depth from the inner peripheral surface of the bush 330 to the radial outer side and is formed in an annular groove shape along a circumferential direction.

According to FIGS. 21A and 21B, the bonding material is filled in the filling groove 335 to form the primary bonding between the shaft 310 and the bush 330 and the bonding material is filled in the third groove part 332 formed at the position separated from the filling groove 335 to form a secondary bonding between the shaft 310 and the bush 330, thereby ensuring a firmer connection between the shaft 310 and the bush 330.

Figure 22A:
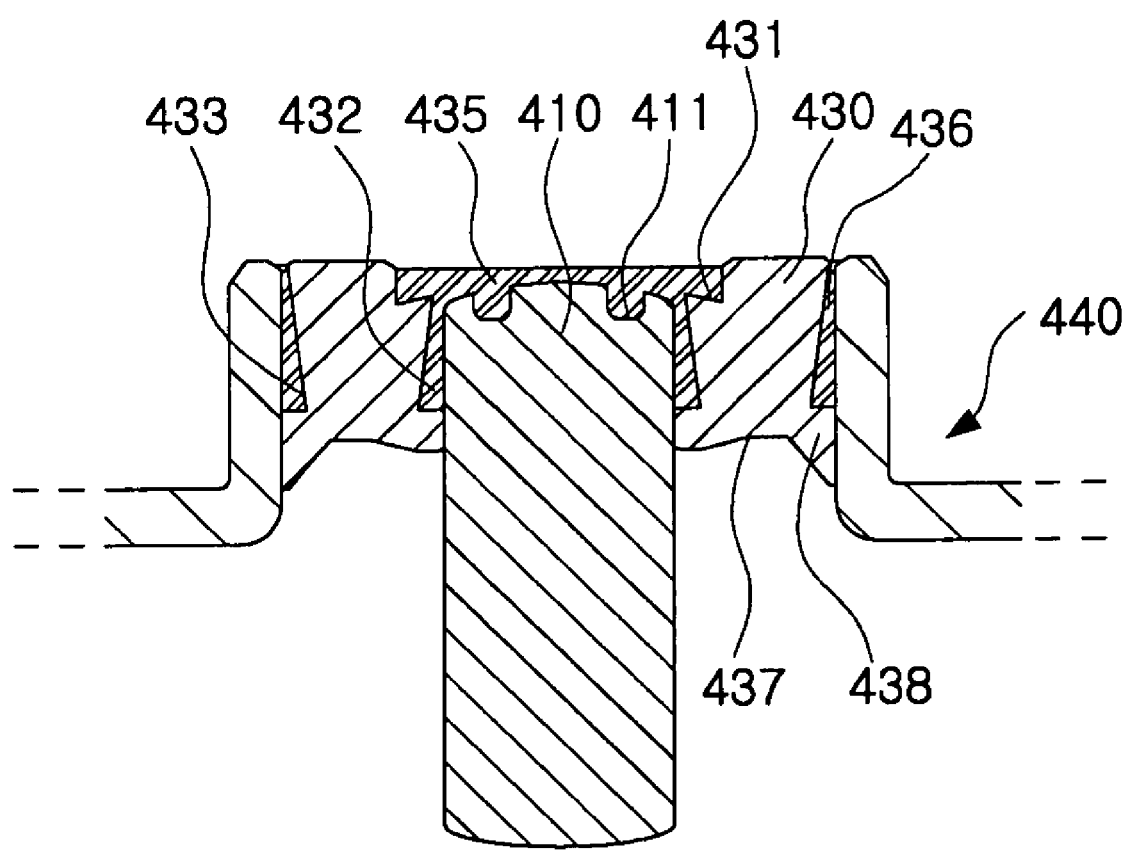
FIG. 22A is a partially enlarged view schematically showing rotating members in a spindle motor according to an eighth exemplary embodiment of the present invention and FIG. 22B is a perspective view and an axial cross-sectional view showing the bush shape.
Figure 22B:
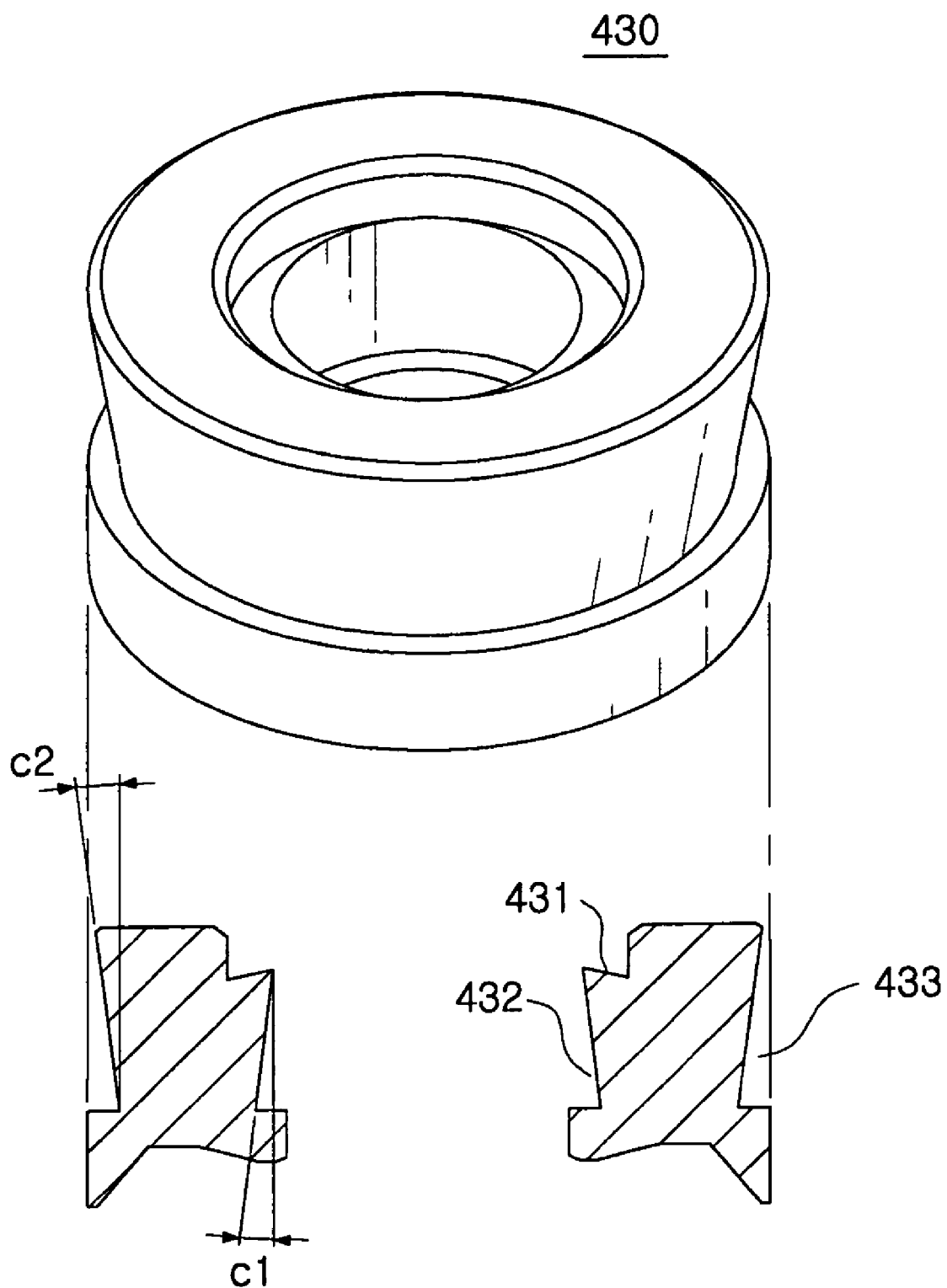
Figure 23A:
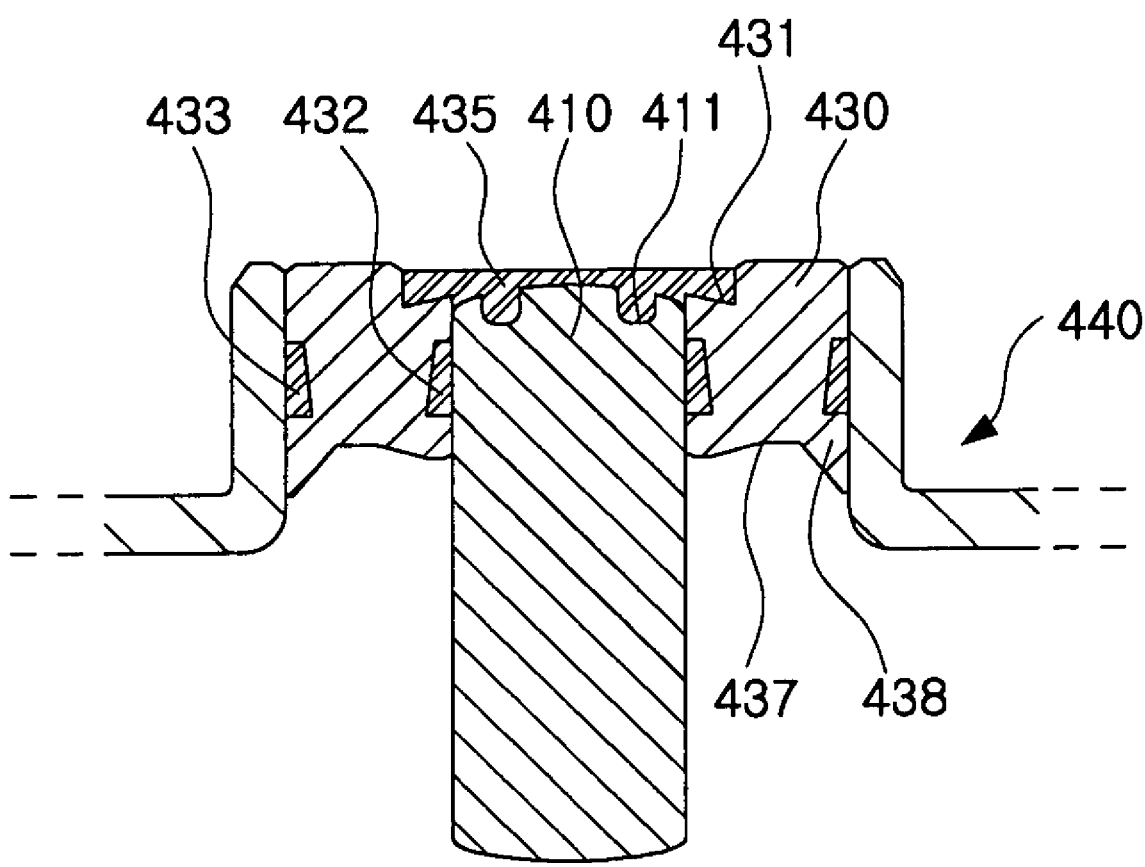
FIG. 23A is a partially enlarged view schematically showing a modified example of the bush in the spindle motor according to the eighth exemplary embodiment of the present invention and FIG. 23B is a perspective view and an axial cross-sectional view showing the bush shape.

FIG. 22A is a partially enlarged view schematically showing rotating members in a spindle motor according to an eighth exemplary embodiment of the present invention, FIG. 22B is a perspective view and an axial cross-sectional view showing the bush shape, FIG. 23A is a partially enlarged view schematically showing a modified example of the bush in the spindle motor according to an eighth exemplary embodiment of the present invention, and FIG. 22B is a perspective view and an axial cross-sectional view showing the bush shape.

The spindle motor according to an eighth exemplary embodiment of the present invention shown in FIGS. 22A and 22B forms a fourth groove part between the outer peripheral surface of the bush and the cylindrical wall part of the rotor case. Other components are substantially the same as the spindle motor according to the seventh exemplary embodiment of the present invention shown in FIG. 20, and therefore, the detailed description thereof will be omitted. Hereinafter, only the differences will mainly be described.

Referring to FIGS. 22A and 22B, in the spindle motor according to the eighth exemplary embodiment of the present invention, a shaft 410 may include a first groove part 411 formed on the outer-diameter side in a circumferential direction and a bush 430 may include a second groove part 431 formed on the inner-diameter side in a circumferential direction, a third groove part 432 formed on the inner peripheral surface in a circumferential direction, a fourth groove part 433 formed to be extended on the outer peripheral surface in the axial bottom portion, and an air flow spreading part 437 and a sealing part 438 formed on the axial bottom portion.

The third groove part 432 may be formed to allow the outer side wall opposite to the outer peripheral surface of the shaft 410 to be inclined by a predetermined angle c1 in the axial direction, may be formed to communicate with the second groove part 431, and may have a deep groove shape extended toward the axial bottom portion from the bottom portion of the second groove part 431.

The fourth groove part 433 communicates with the axial top surface of the bush 430 and may form a deep groove formed to be extended toward the axial bottom portion together with the cylindrical wall part of the rotor case. The fourth groove 433 may be formed to allow the side wall opposite to the cylindrical wall part of the rotor case to be inclined by a predetermined angle c2 in the axial direction.

A first filling groove 435 may be formed by the top portion of the shaft 410 including the first groove part 411 and the side walls of the second groove part 431 and the third groove part 432 and the second filling groove 436 may be formed by the side wall of the fourth groove part 433 and the cylindrical wall part of the rotor case. The bonding material may be filled in the first filling groove 435 and the second filling groove 436.

According to the eighth exemplary embodiment of the present invention, the filling groove is formed between the shaft 410 and the bush 430 and between the bush 430 and the rotor case, thereby improving the adhesion between the bush 430 and the rotor case by the bonding material filled in the second filling groove 436.

Figure 23B:
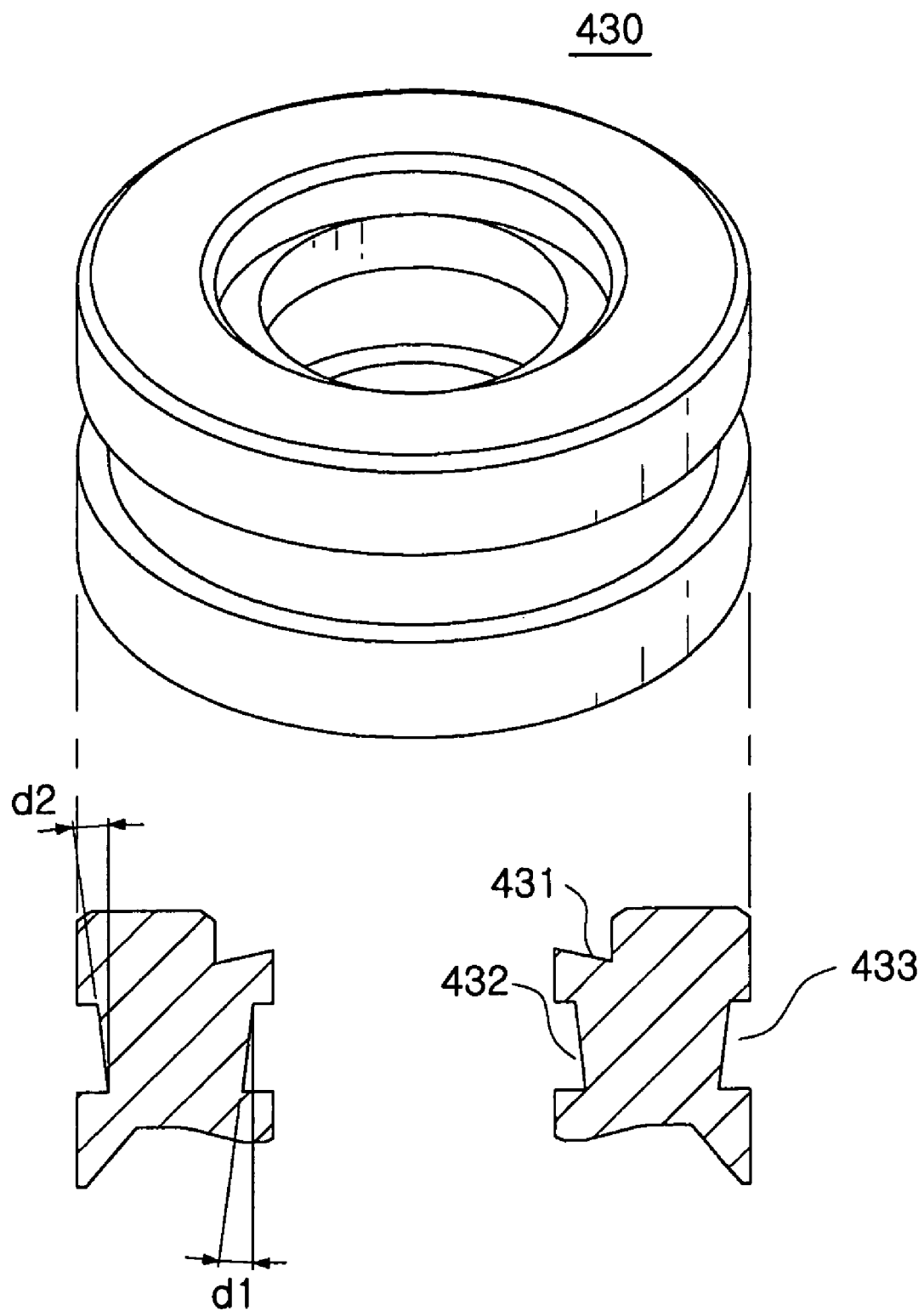

FIGS. 23A and 23B show a modified example of the third groove part 432 and the fourth groove part 433 of FIG. 22. The third groove part 432 does not communicate with the second groove part 431 and is depressed by a predetermined depth from the inner peripheral surface of the bush 430 to the radial outer side and is formed in an annular groove shape along a circumferential direction.

The fourth groove part 433 does not communicate with the axial top surface of the bush 430 and is depressed by a predetermined depth from the outer peripheral surface of the bush 30 to the radial outer side, and has an annular groove shape along a circumference direction.

In addition, the third groove part 432 may be formed to allow the side wall opposite to the outer peripheral surface of the shaft 410 to be inclined by a predetermined angle d1, and the fourth groove part 433 may be formed to allow the side wall opposite to the cylindrical wall part of the rotor case to be inclined by a predetermined angle d2.

According to FIGS. 23A and 23B, since the third groove part 432 does not communicate with the second groove part 431, the bonding between the shaft 410 and the bush 430 may be secondarily made. Since the fourth groove part 433 does not communicate with the axial top surface of the bush 430, it is possible to prevent the bonding material of the fourth groove part 433 from overflowing to the outside of the bush 430.

As set forth above, the spindle motor and the optical disk driver having the same according to the exemplary embodiments of the present invention sufficiently secure the axial gap between the rotating members and the fixing members by changing the structure of the bush combined with the shaft to reduce the air flow turbulence caused when the rotating members are rotated according to the slimness of the spindle motor, thereby securing the rotational stability such as the reduction in the occurrence of noise and vibration, or the like, caused when the spindle motor is rotated.

In addition, the exemplary embodiment of the present invention forms the sealing part on the bottom portion of the bush, thereby preventing the oil leakage from the sleeve when the spindle motor is rotated at high speed.

Further, the exemplary embodiment of the present invention reinforces the rigidity of the spindle motor, thereby securing the assembly and rotation station of the spindle motor while preventing the degradation in rigidity of the spindle motor due to the slimness of the spindle motor.

Further, the exemplary embodiment of the present invention solidifies the combination of components of the rotating members, thereby securing the assembly and rotation stability of the spindle motor from the external impact applied to the spindle motor or the force applied when the disk is removed.

In addition, the present invention can efficiently reduce power consumed for the assembly and rotation driving of the spindle motor according to the improved characteristics of the spindle motor.

While the present invention has been shown and described in connection with the exemplary embodiments, it will be apparent to those skilled in the art that modification and variation can be made without departing from the spirit and scope of the invention as defined by the appended claims.

What is claimed is:

1. A spindle motor comprising:
   a sleeve rotatably supporting a shaft;
   a bush combined with the top portion of the shaft to be rotated together with the shaft;
   a rotor case including a cylindrical wall part combined with an outer peripheral surface of the bush;
   an air flow spreading part formed on an axial bottom part of the bush and spreading the air flow generated between the shaft and the sleeve to a radial outer side when the shaft is rotated; and
   a sealing part formed on the axial bottom portion of the bush and formed between the cylindrical wall part and the air flow spreading part to seal oil when the shaft is rotated.

2. The spindle motor of claim 1, wherein the air flow spreading part is formed such that an axial gap between the air flow spearing part and a top surface of the sleeve is increased toward the radial outer side.

3. The spindle motor of claim 1, wherein the air flow spreading part is formed to be inclined upwardly toward the radial outer side of the bush.

4. The spindle motor of claim 1, wherein the bottom portion of the bush is provided with an annular groove part by the air flow spreading part and the sealing part.

5. The spindle motor of claim 4, wherein at least one of both side walls of the annular groove part is formed to be inclined.

6. The spindle motor of claim 1, wherein an outer diameter of the air flow spreading part is formed to be substantially equal to that of the sleeve.

7. The spindle motor of claim 1, wherein the sealing part is formed to be inclined downwardly from the radial outer side of the air flow spreading part to an inner peripheral surface of the cylindrical wall part.

8. The spindle motor of claim 1, further comprising a taper part formed on the axial bottom portion of the bush and formed between an outer peripheral surface of the shaft and the air flow spreading part.

9. The spindle motor of claim 8, wherein the taper part is formed to be inclined downwardly toward the outer peripheral surface of the shaft from a radial inner side of the air flow spreading part.

10. A spindle motor comprising:
    a sleeve rotatably supporting a shaft;
    a bush combined with a top portion of the shaft to be rotated together with the shaft; and
    a groove part formed on an axial bottom part of the bush and including a first inclined surface formed to be inclined upwardly toward a radial outer side of the bush and a second inclined surface formed to be inclined downwardly toward the radial outer side from the first inclined surface.

11. The spindle motor of claim 10, wherein the first inclined surface is formed to have inclination smaller than the second inclined surface.

12. A spindle motor comprising:
    a bush combined with a top portion of a shaft to be rotated together with the shaft;
    a rotor case including a cylindrical wall part combined with an outer peripheral surface of the bush; and
    a filling groove formed in at least one of a boundary portion between the shaft and the bush and a boundary portion between the bush and the cylindrical wall part, and filled with a bonding material.

13. The spindle motor of claim 12, wherein the filling groove includes a first annular groove part formed on an outer-diameter side of the shaft in a circumferential direction.

14. The spindle motor of claim 13, wherein the first annular groove part is formed to be expanded toward an axial top portion.

15. The spindle motor of claim 13, wherein the first annular groove part is formed to be narrower toward an axial top portion.

16. The spindle motor of claim 13, wherein one side of the first annular groove part is formed to be opened to an inner peripheral surface of the bush.

17. The spindle motor of claim 13, wherein the filling groove may include a second annular groove part formed on an inner-diameter side of the bush in a circumferential direction.

18. The spindle motor of claim 17, wherein one side of the second annular groove part is opened to an outer peripheral surface of the shaft.

19. The spindle motor of claim 18, wherein the other side of the second annular groove part is formed to be inclined by a predetermined angle from an axial direction.

20. The spindle motor of claim 18, wherein a bottom portion of the second annular groove part is formed to be inclined by a predetermined angle in a radial direction.

21. The spindle motor of claim 18, wherein a bottom portion of the second annular groove part is formed to be stepped.

22. The spindle motor of claim 18, further comprising a third annular groove part formed on the inner peripheral surface of the bush to be extended in an axial direction.

23. The spindle motor of claim 22, wherein the third annular groove part is formed to communicate with the second annular groove part.

24. The spindle motor of claim 22, wherein the third annular groove part is formed to allow a side wall thereof to be inclined by a predetermined angle in the axial direction.

25. The spindle motor of claim 22, further comprising a fourth annular groove part formed on an outer-diameter side of the bush in a circumferential direction.

26. The spindle motor of claim 25, wherein the fourth annular groove part is formed to be extended in the axial direction from a top outer peripheral portion of the bush.

27. The spindle motor of claim 25, wherein the fourth annular groove part is formed to allow a side wall thereof to be inclined by a predetermined angle in the axial direction.

28. A disk driver comprising:
a bush combined with a top portion of a shaft to be rotated together with the shaft;
a rotor including a rotor case including a cylindrical wall part fixedly combined with an outer peripheral surface of the bush and a magnet mounted on an inner side of the rotor case;
a chucking part mounted in the rotor case and removably combining a disk;
a sleeve rotatably supporting the shaft;
a stator including a holder supporting the sleeve and a magnetic material interacting with the magnet;
an air flow spreading part formed on an axial bottom portion of the bush and spreading air flow generated between the shaft and the sleeve when the shaft is rotated to a radial outer side; and
a sealing part formed on an axial bottom portion of the bush and formed between a cylindrical wall part and the air flow spreading part to seal oil when the shaft is rotated.

29. The disk driver of claim 28, wherein the air flow spreading part is formed to be inclined upwardly to allow an axial gap between the air spreading part and the top surface of the sleeve to be increased toward the radial outer side.

30. The disk driver of claim 28, wherein the bottom portion of the bush is provided with an annular groove part by the air flow spreading part and the sealing part, and at least one of both side walls of the annular groove part is formed to be inclined.

31. The disk driver of claim 28, wherein an outer diameter of the air flow spreading part is formed to be substantially equal to that of the sleeve.

32. The disk driver of claim 28, wherein the sealing part is formed to be inclined downwardly toward an inner peripheral surface of the cylindrical wall part from the radial outer side of the air flow spreading part.

33. A disk driver comprising:
a bush combined with a top portion of a shaft to be rotated together with a shaft;
a rotor including a rotor case including a cylindrical wall part fixedly combined with an outer peripheral surface of the bush and a magnet mounted on an inner side of the rotor case;
a chucking part mounted in the rotor case and removably combining a disk;
a sleeve rotatably supporting the shaft;
a stator including a holder supporting the sleeve and a magnetic material interacting with the magnet; and
a filling groove filled in at least one of a boundary portion between the shaft and the bush and a boundary portion between the bush and the cylindrical wall part.

34. The disk driver of claim 33, wherein the filling groove includes:
a first annular groove part formed on an outer-diameter side of the shaft in a circumferential direction;
a second annular groove part formed on an inner-diameter side of the bush in a circumferential direction;
a third annular groove part formed to be longer on an inner peripheral surface of the bush in an axial direction.

35. The disk driver of claim 34, further comprising a fourth annular groove part formed on an outer diameter side of the bush in a circumferential direction.

36. The disk driver of claim 33, further comprising:
an air flow spreading part formed on an axial bottom part of the bush and spreading the air flow generated between the shaft and the sleeve when the shaft is rotated to a radial outer side; and
a sealing part formed on the axial bottom part of the bush and formed between the cylindrical wall part and the air flow spreading part to seal oil when the shaft is rotated.

37. The disk driver of claim 36, wherein the air flow spreading part is formed to be inclined upwardly to allow an axial gap between the air flow spreading part and the top surface of the sleeve to be increased to the radial outer side.

38. The disk driver of claim 36, wherein the sealing part is formed to be inclined downwardly from the radial outer side of the air flow spreading part to an inner peripheral surface of the cylindrical wall part.

* * * * *

UNITED STATES PATENT AND TRADEMARK OFFICE
CERTIFICATE OF CORRECTION

PATENT NO. : 8,370,868 B2
APPLICATION NO. : 13/064438
DATED : February 5, 2013
INVENTOR(S) : Viatcheslav Smirnov et al.

Page 1 of 2

It is certified that error appears in the above-identified patent and that said Letters Patent is hereby corrected as shown below:

In the Claims
In Column 17, Line 37, In Claim 1, delete "bush" and insert -- bushing --, therefor.
In Column 17, Line 40, In Claim 1, delete "bush" and insert -- bushing --, therefor.
In Column 17, Line 42, In Claim 1, delete "bush" and insert -- bushing --, therefor.
In Column 17, Line 46, In Claim 1, delete "bush" and insert -- bushing --, therefor.
In Column 17, Line 55, In Claim 3, delete "bush" and insert -- bushing --, therefor.
In Column 17, Line 57, In Claim 4, delete "bush" and insert -- bushing --, therefor.
In Column 18, Line 2, In Claim 8, delete "bush" and insert -- bushing --, therefor.
In Column 18, Line 11 (Approx.), In Claim 10, delete "bush" and insert -- bushing --, therefor.
In Column 18, Line 13, In Claim 10, delete "bush" and insert -- bushing --, therefor.
In Column 18, Line 15, In Claim 10, delete "bush" and insert -- bushing --, therefor.
In Column 18, Line 24, In Claim 12, delete "bush" and insert -- bushing --, therefor.
In Column 18, Line 27, In Claim 12, delete "bush" and insert -- bushing --, therefor.
In Column 18, Line 29, In Claim 12, delete "bush" and insert -- bushing --, therefor.
In Column 18, Line 30, In Claim 12, delete "bush" and insert -- bushing --, therefor.
In Column 18, Line 43, In Claim 16, delete "bush" and insert -- bushing --, therefor.
In Column 18, Line 46, In Claim 17, delete "bush" and insert -- bushing --, therefor.
In Column 18, Line 61, In Claim 22, delete "bush" and insert -- bushing --, therefor.
In Column 19, Line 3, In Claim 25, delete "bush" and insert -- bushing --, therefor.
In Column 19, Line 6, In Claim 26, delete "bush" and insert -- bushing --, therefor.
In Column 19, Line 11, In Claim 28, delete "bush" and insert -- bushing --, therefor.
In Column 19, Line 15, In Claim 28, delete "bush" and insert -- bushing --, therefor.
In Column 19, Line 23, In Claim 28, delete "bush" and insert -- bushing --, therefor.
In Column 19, Line 26, In Claim 28, delete "bush" and insert -- bushing --, therefor.
In Column 19, Line 34, In Claim 30, delete "bush" and insert -- bushing --, therefor.
In Column 20, Line 2, In Claim 33, delete "bush" and insert -- bushing --, therefor.
In Column 20, Line 6, In Claim 33, delete "bush" and insert -- bushing --, therefor.
In Column 20, Line 14, In Claim 33, delete "bush" and insert -- bushing --, therefor.
In Column 20, Line 15, In Claim 33, delete "bush" and insert -- bushing --, therefor.

Signed and Sealed this
Eighteenth Day of February, 2014

Michelle K. Lee
*Deputy Director of the United States Patent and Trademark Office*

In Column 20, Line 21, In Claim 34, delete "bush" and insert -- bushing --, therefor.
In Column 20, Line 23, In Claim 34, delete "bush" and insert -- bushing --, therefor.
In Column 20, Line 26, In Claim 35, delete "bush" and insert -- bushing --, therefor.
In Column 20, Line 29, In Claim 36, delete "bush" and insert -- bushing --, therefor.
In Column 20, Line 32, In Claim 36, delete "bush" and insert -- bushing --, therefor.